(12) United States Patent
Krumpelman

(10) Patent No.: US 10,161,391 B2
(45) Date of Patent: Dec. 25, 2018

(54) SHAPE MEMORY HAPTIC ACTUATOR DEVICE

(71) Applicant: Synaptics Incorporated, San Jose, CA (US)

(72) Inventor: Douglas Krumpelman, Coeur d'Alene, ID (US)

(73) Assignee: Synaptics Incorporated, San Jose, CA (US)

( * ) Notice: Subject to any disclaimer, the term of this patent is extended or adjusted under 35 U.S.C. 154(b) by 292 days.

(21) Appl. No.: 15/087,974

(22) Filed: Mar. 31, 2016

(65) Prior Publication Data
US 2017/0284379 A1 Oct. 5, 2017

(51) Int. Cl.
*F03G 7/06* (2006.01)
*H02N 10/00* (2006.01)
*G06F 3/041* (2006.01)
*G06F 3/01* (2006.01)

(52) U.S. Cl.
CPC ............ *F03G 7/065* (2013.01); *G06F 3/016* (2013.01); *G06F 3/041* (2013.01); *H02N 10/00* (2013.01)

(58) Field of Classification Search
CPC .................................. F03G 7/065; G06F 3/016
See application file for complete search history.

(56) References Cited

U.S. PATENT DOCUMENTS 9,068,561 B2    6/2015  Gondo

FOREIGN PATENT DOCUMENTS

JP          2014088818 A  *  5/2014

* cited by examiner

*Primary Examiner* — Jonathan Matthias
(74) *Attorney, Agent, or Firm* — Ferguson Braswell Fraser Kubasta PC

(57) ABSTRACT

A haptic actuator and method for manufacturing the same. The haptic actuator may include a slider having first interlocking sliding features and a first engagement surface; and a base having second interlocking sliding features and a second engagement surface. The second interlocking sliding features may be configured to engage with the first interlocking sliding features. The haptic actuator may also include a shape memory alloy disposed between the first engagement surface and the second engagement surface; and a pair of ohmic contacts disposed through the base and are in direct contact with the shape memory alloy. The shape memory alloy may contract and causes displacement of the slider relative to the base from a first position to a second position in response to a current applied to the shape memory alloy through the pair of ohmic contacts.

20 Claims, 20 Drawing Sheets

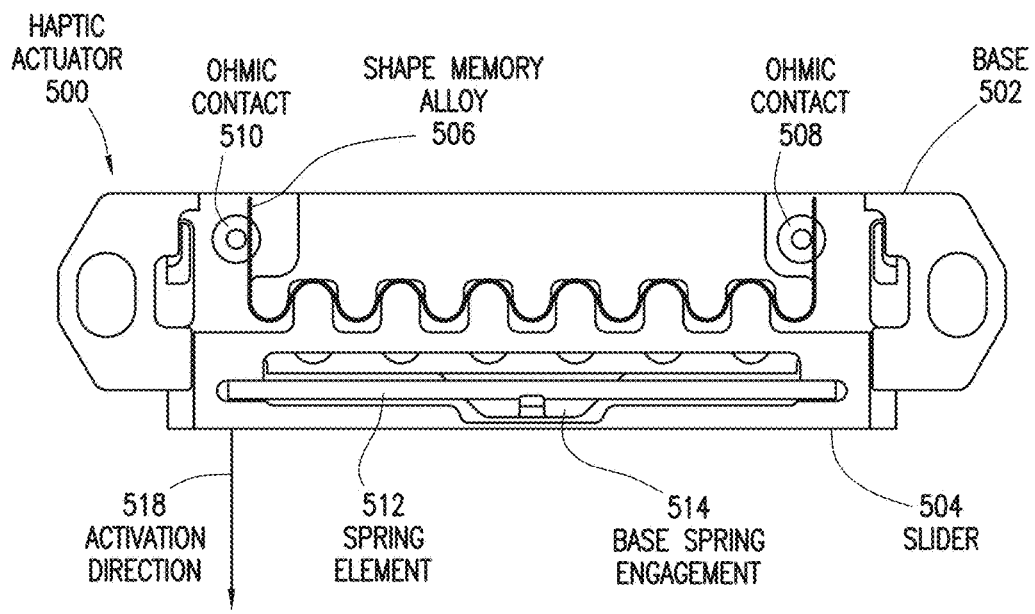
FIG. 5.1
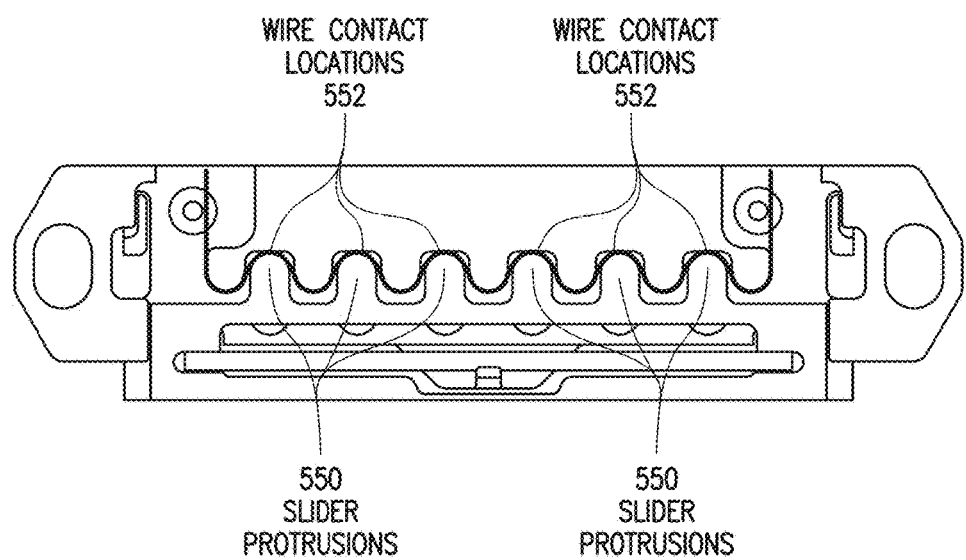
FIG. 5.2

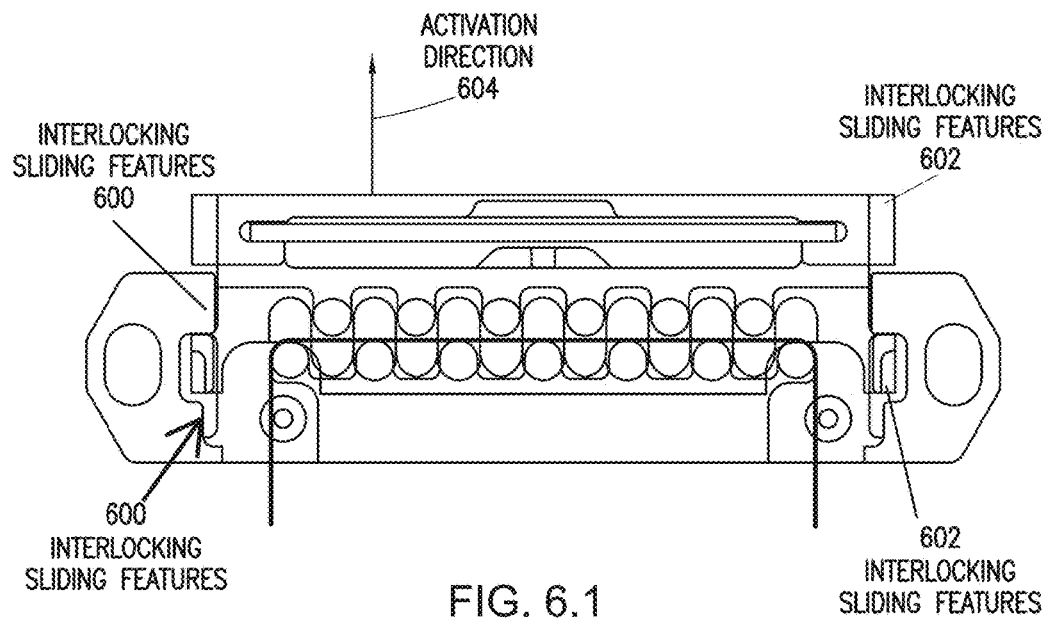
FIG. 6.1
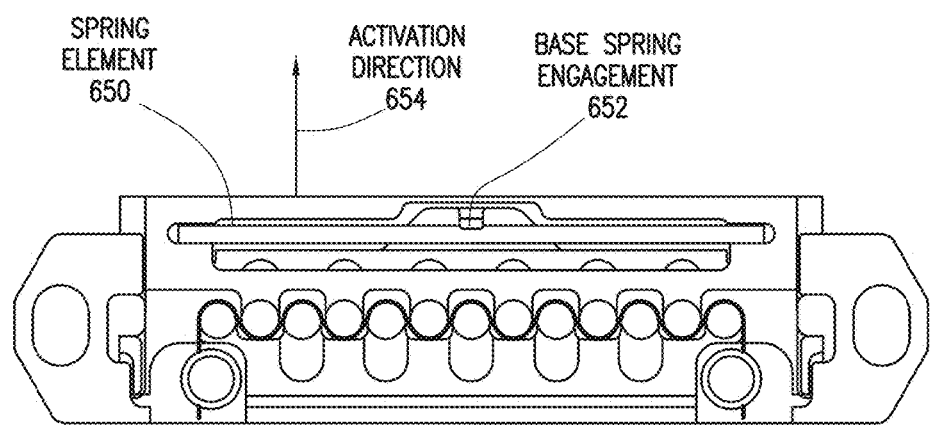
FIG. 6.2

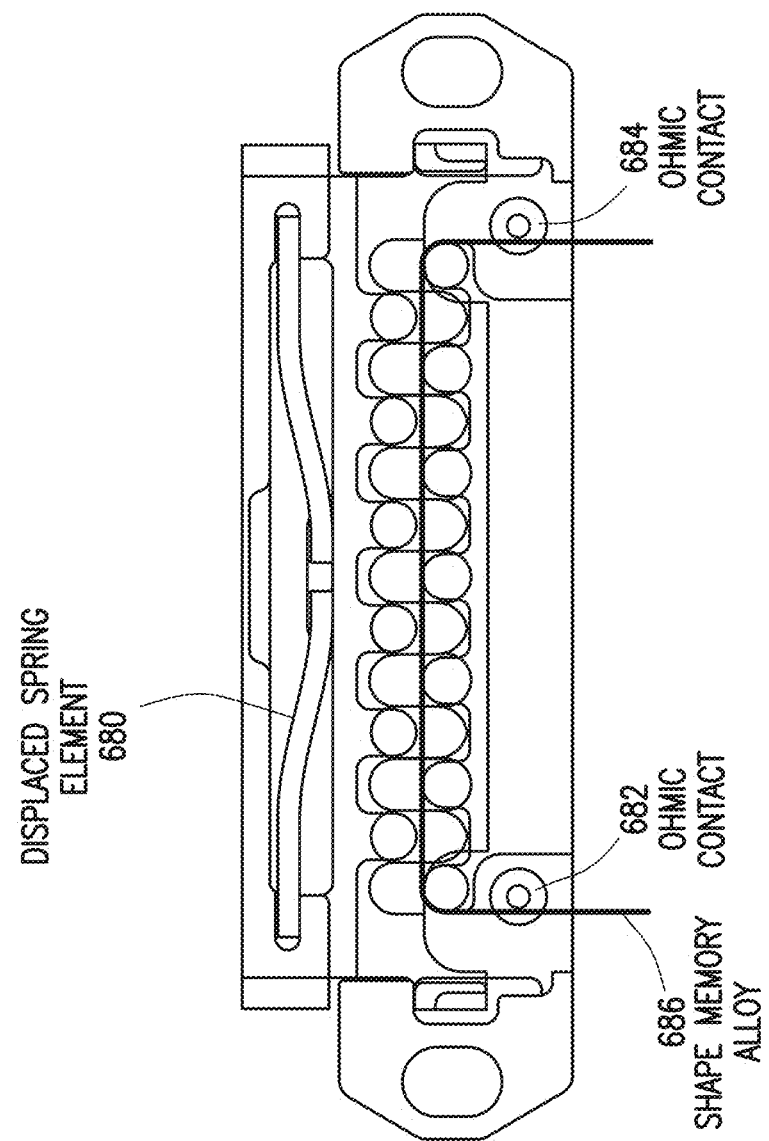
FIG. 6.3

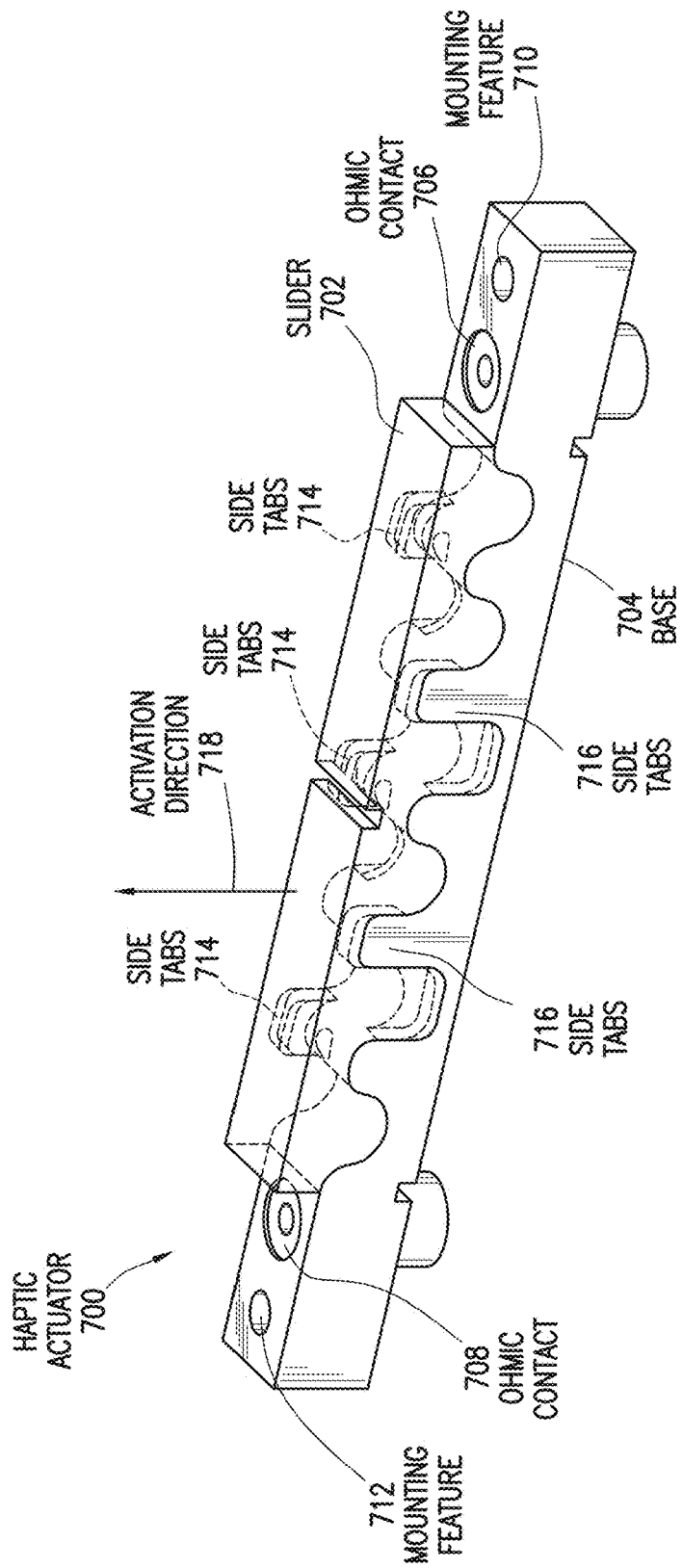

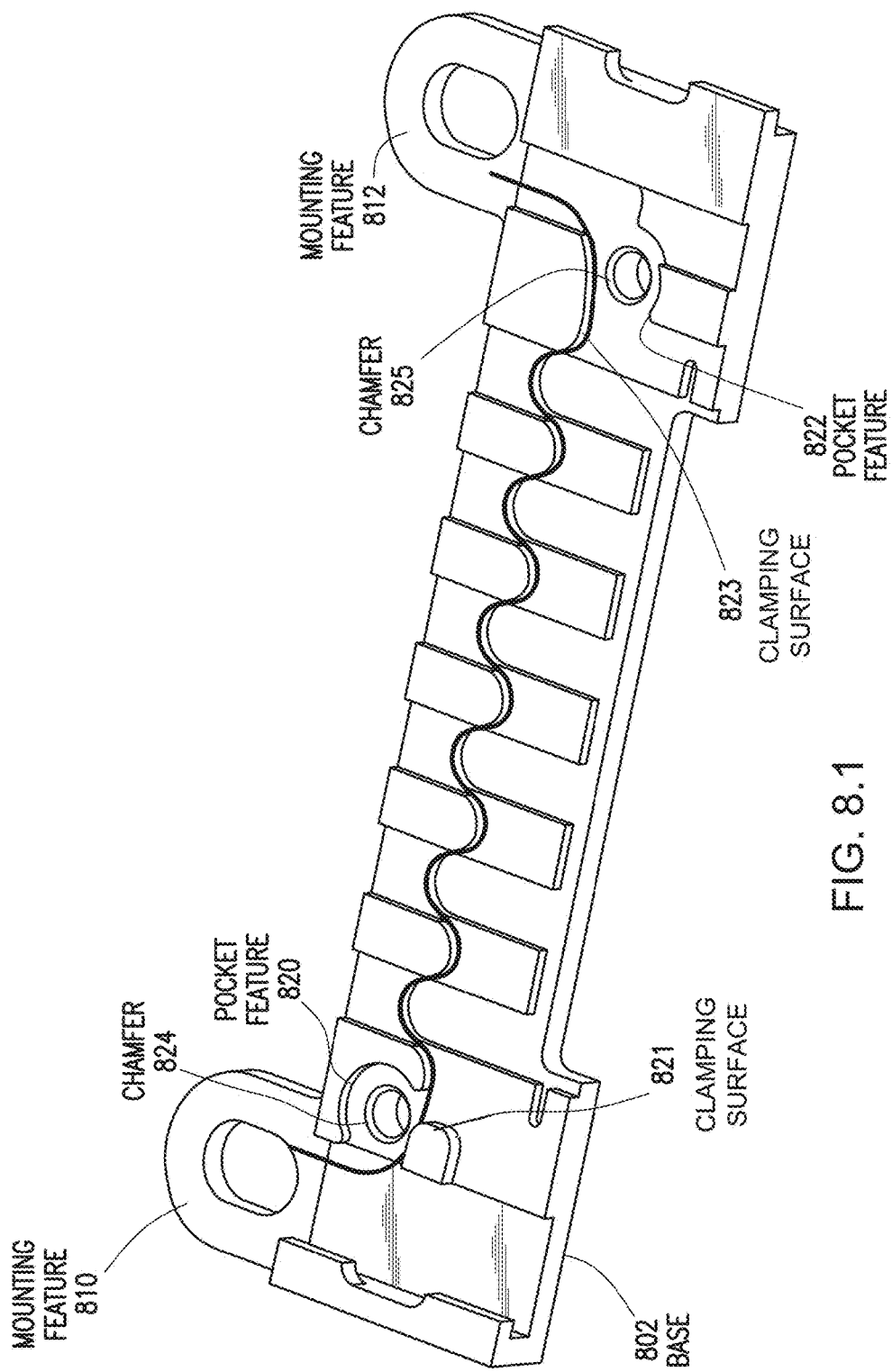
FIG. 8.1

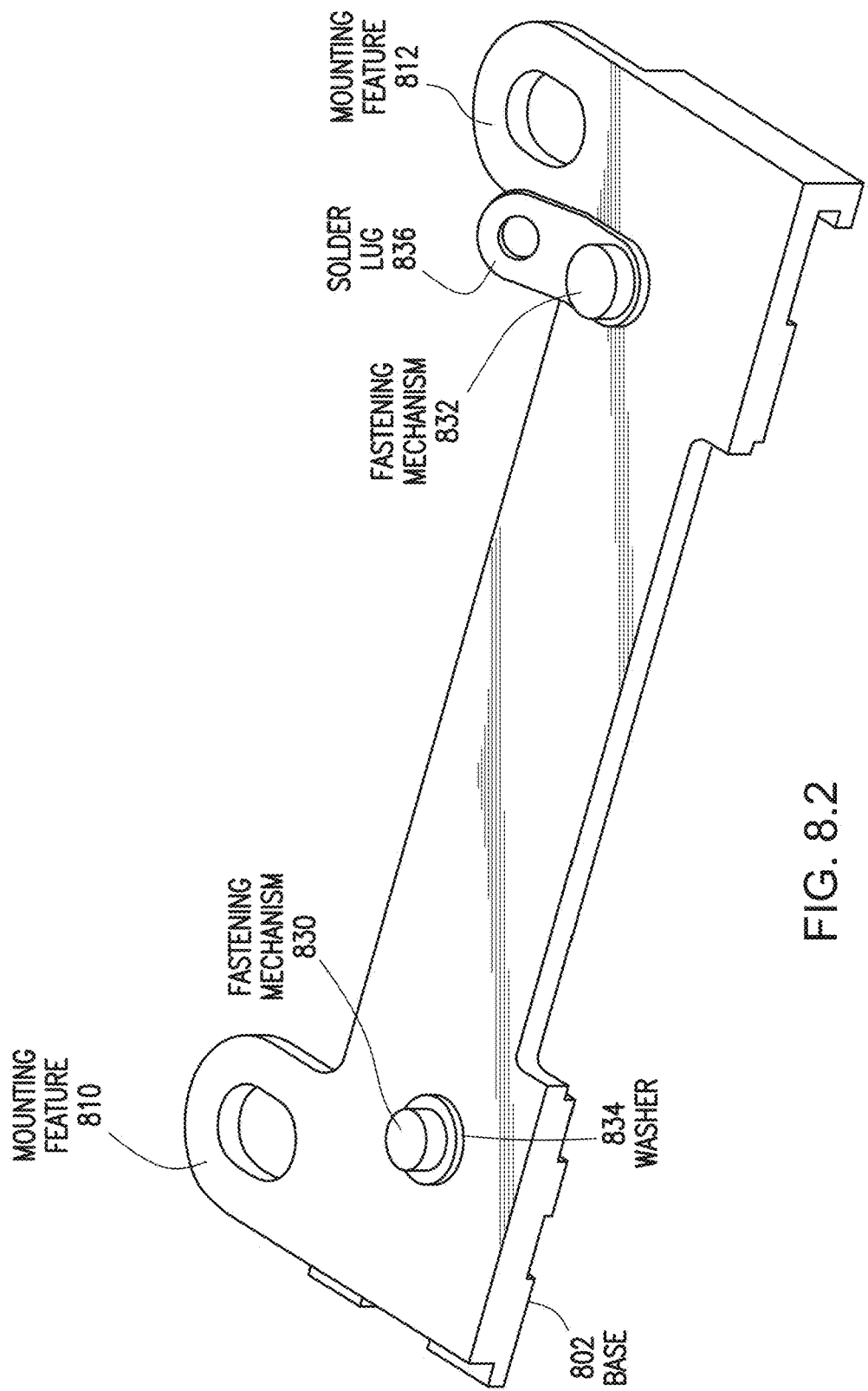
FIG. 8.2

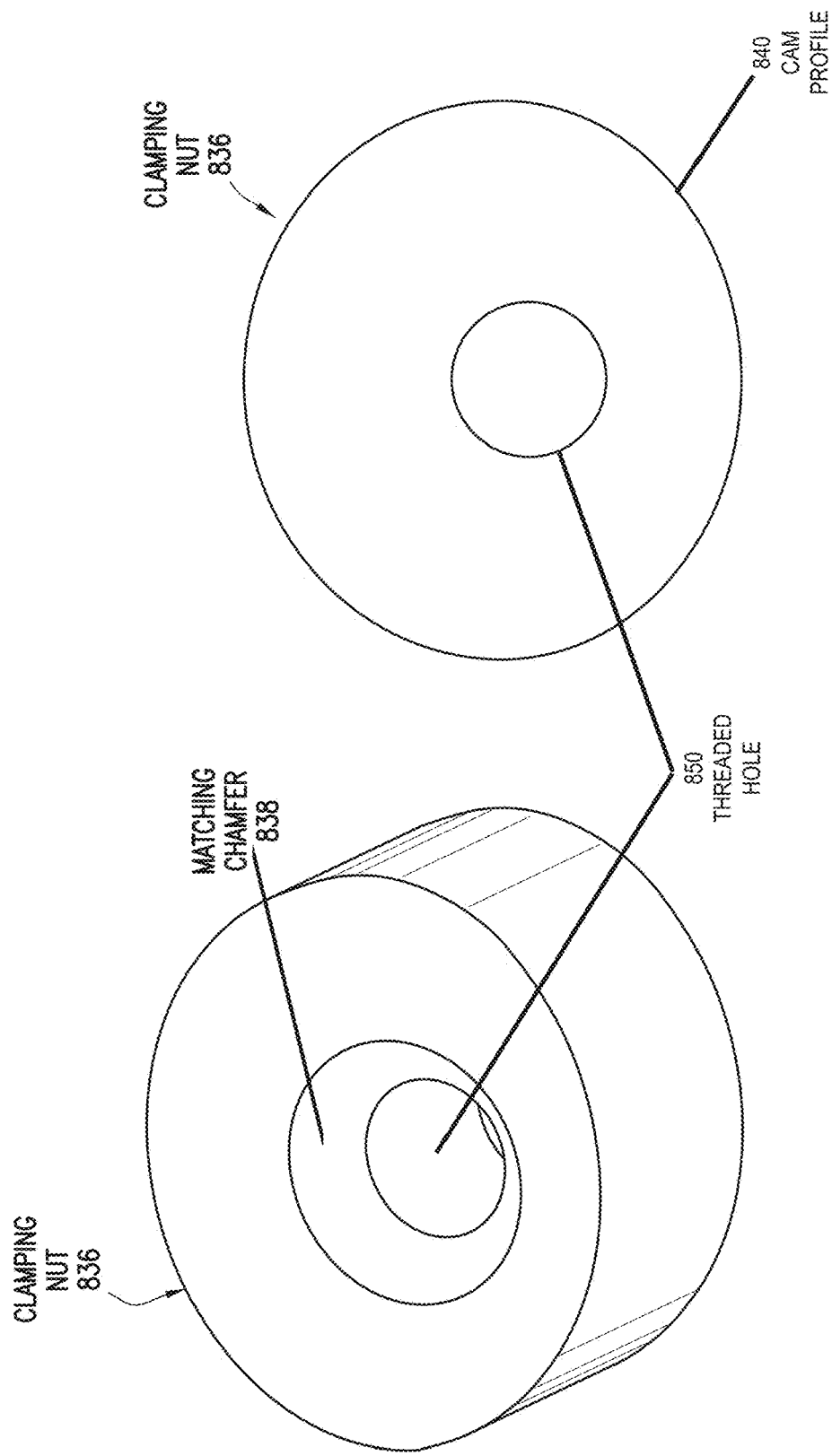

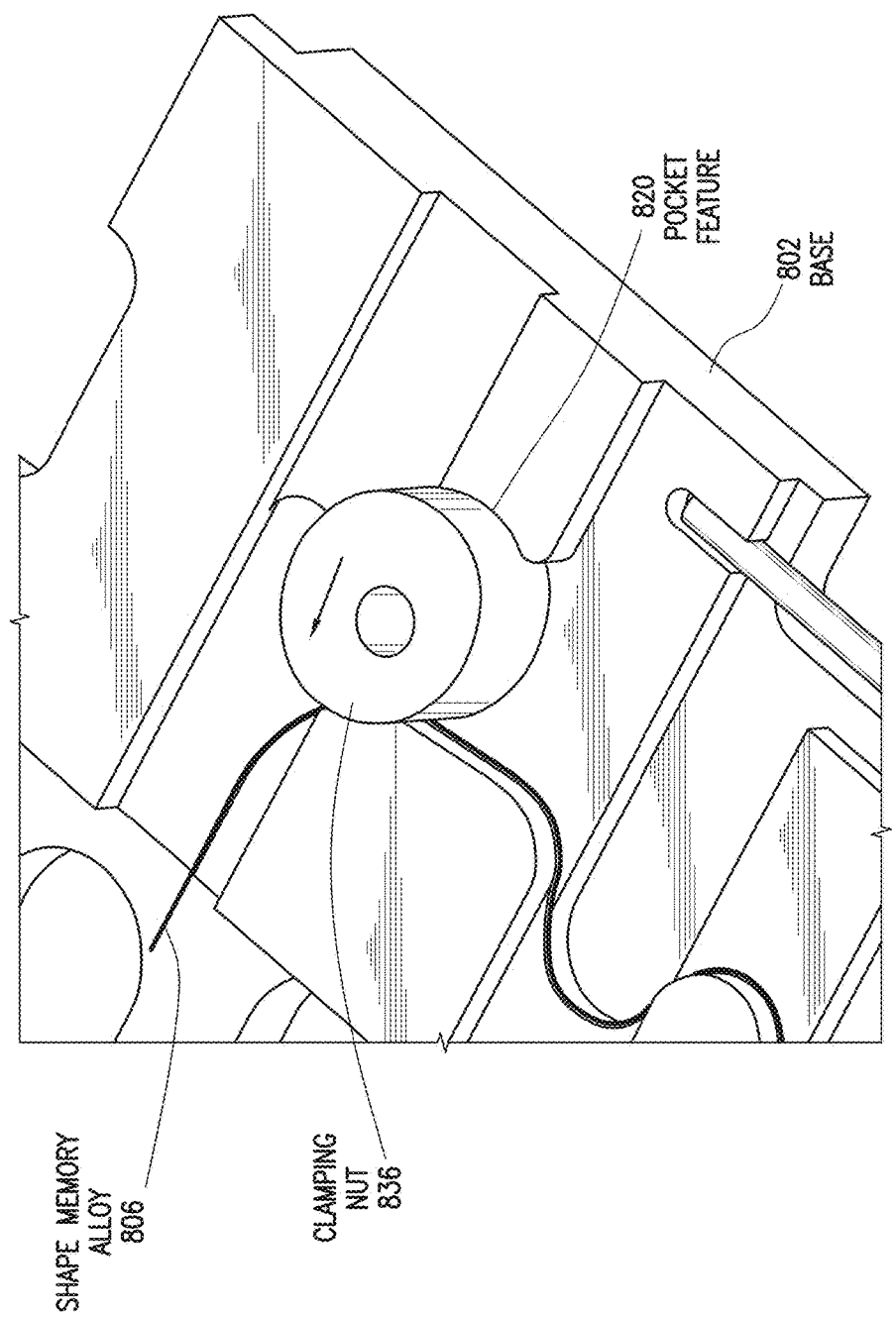
FIG. 8.5

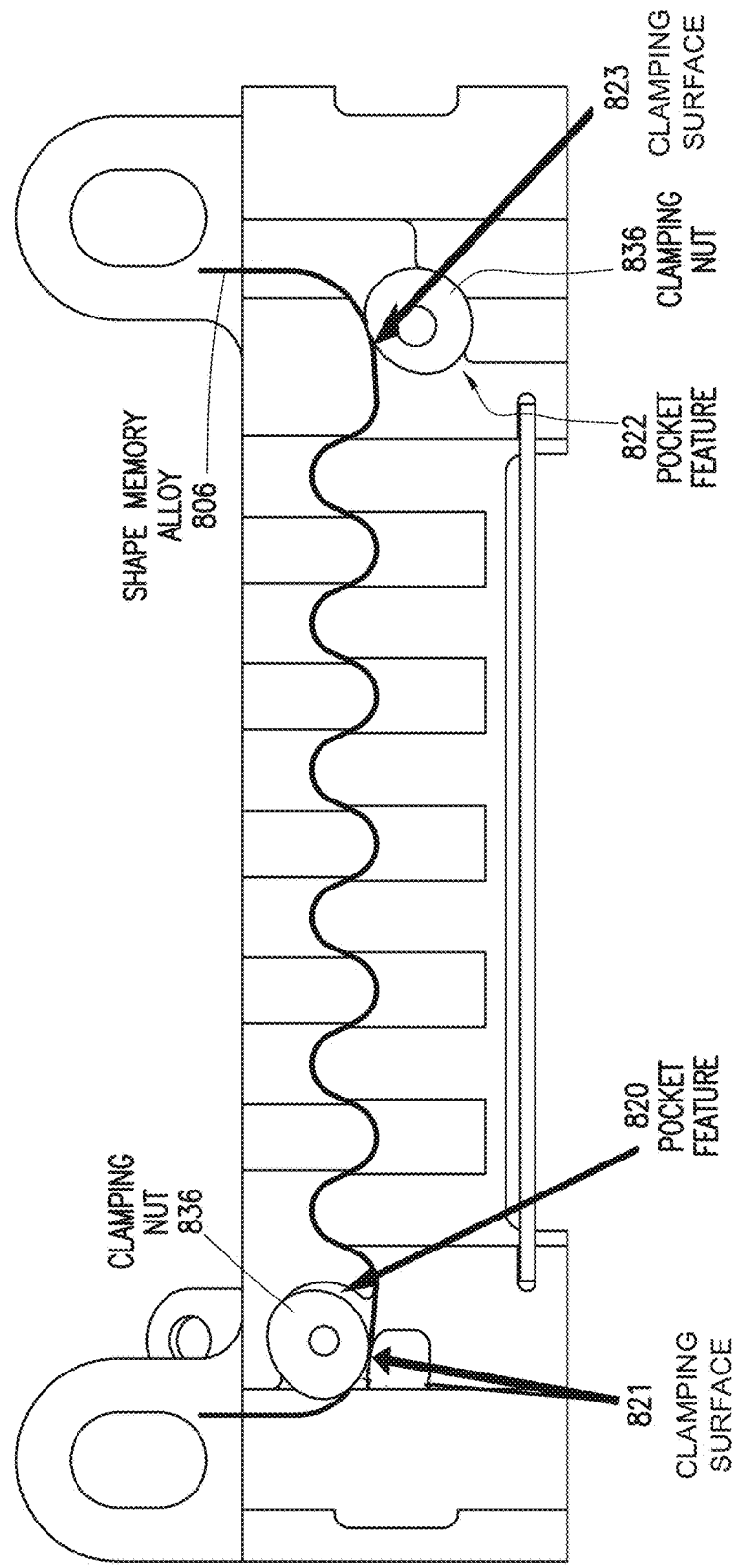
FIG. 8.6

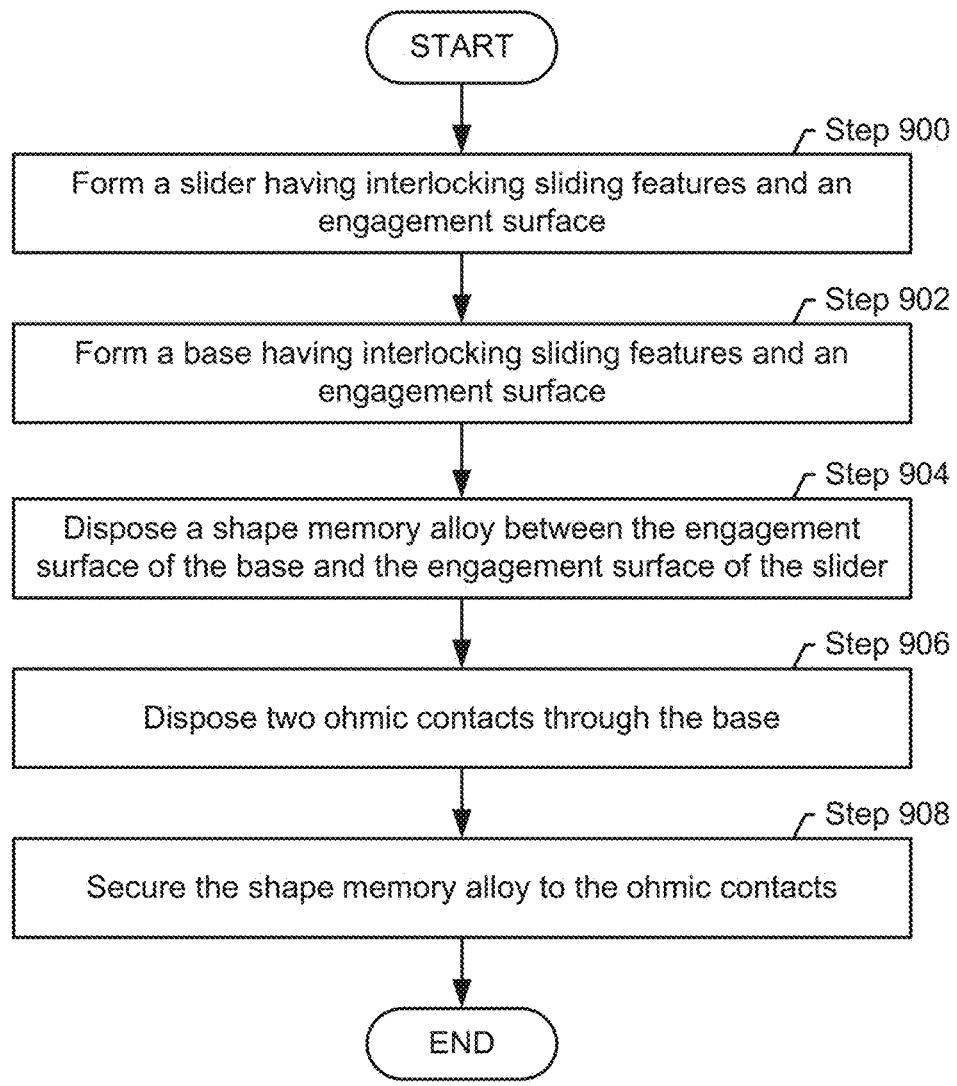
FIG. 9.1

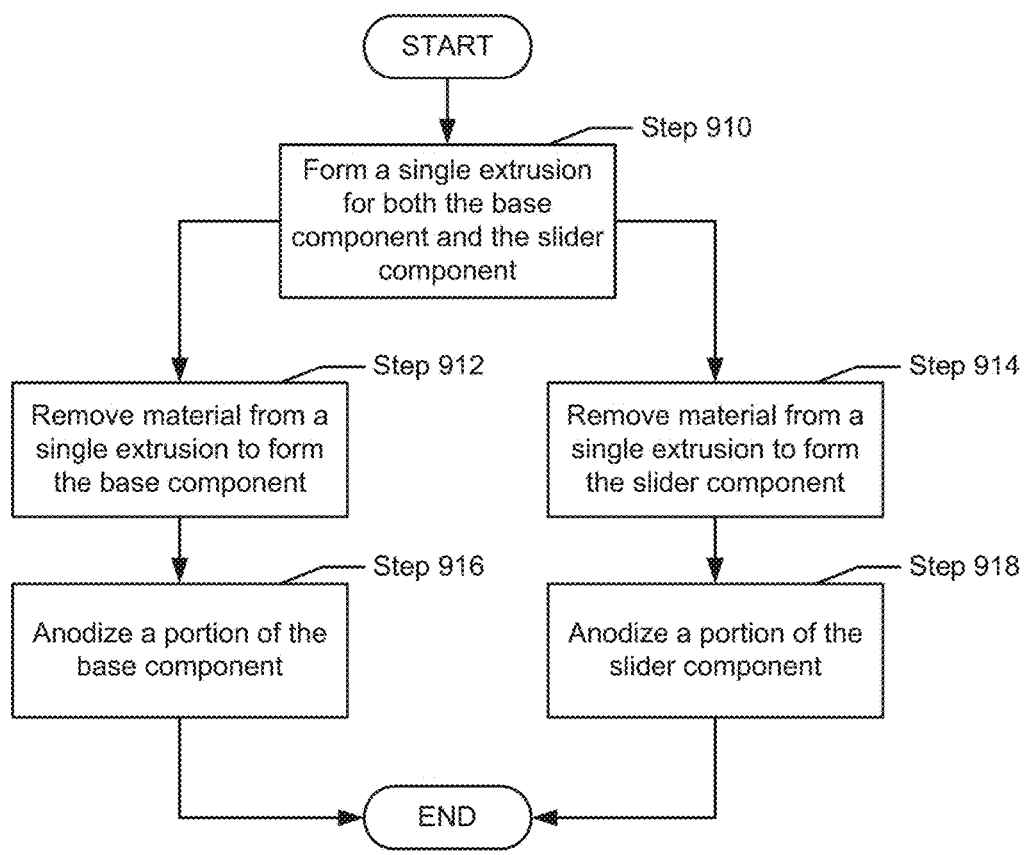
FIG. 9.2

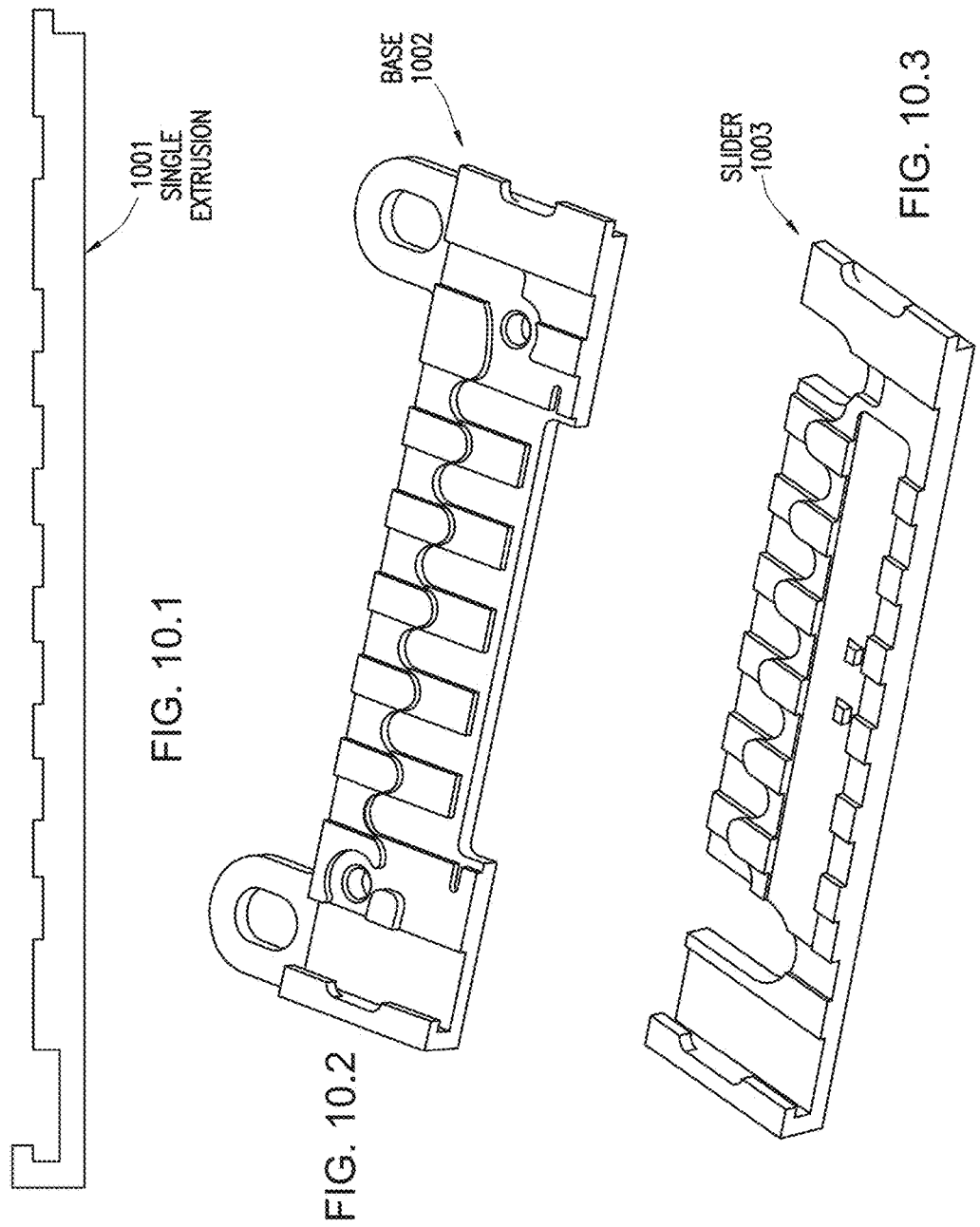

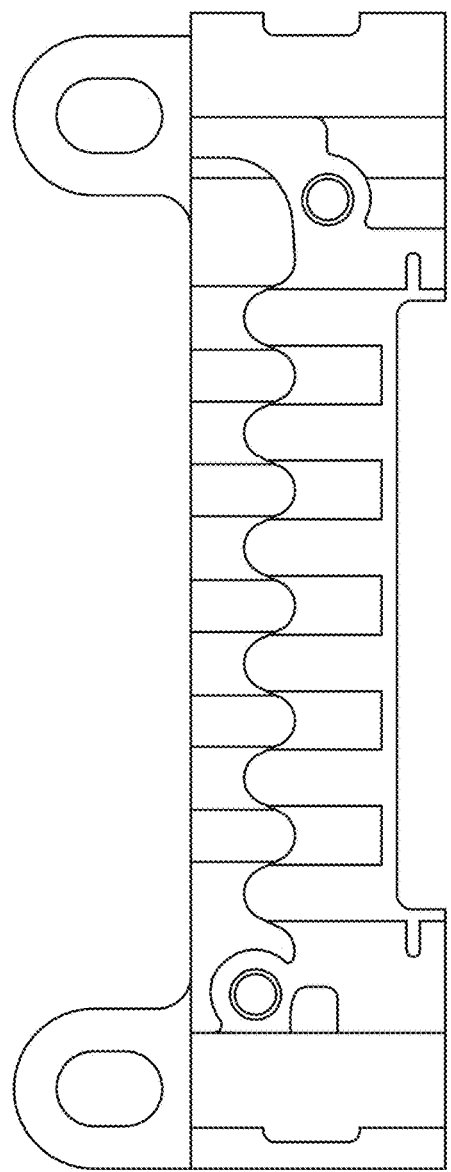
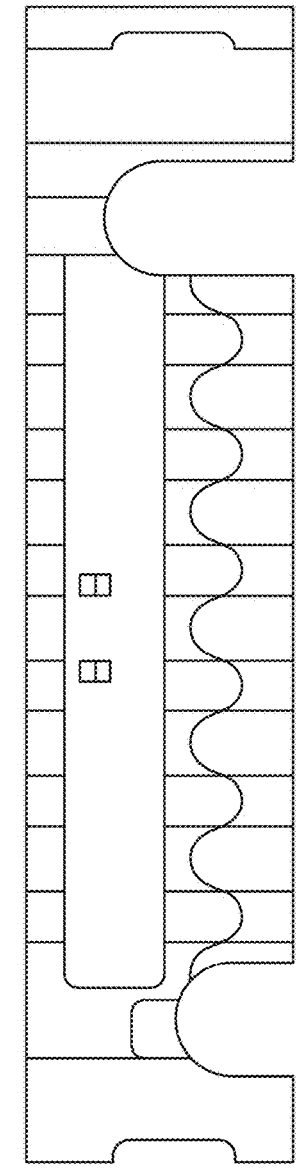

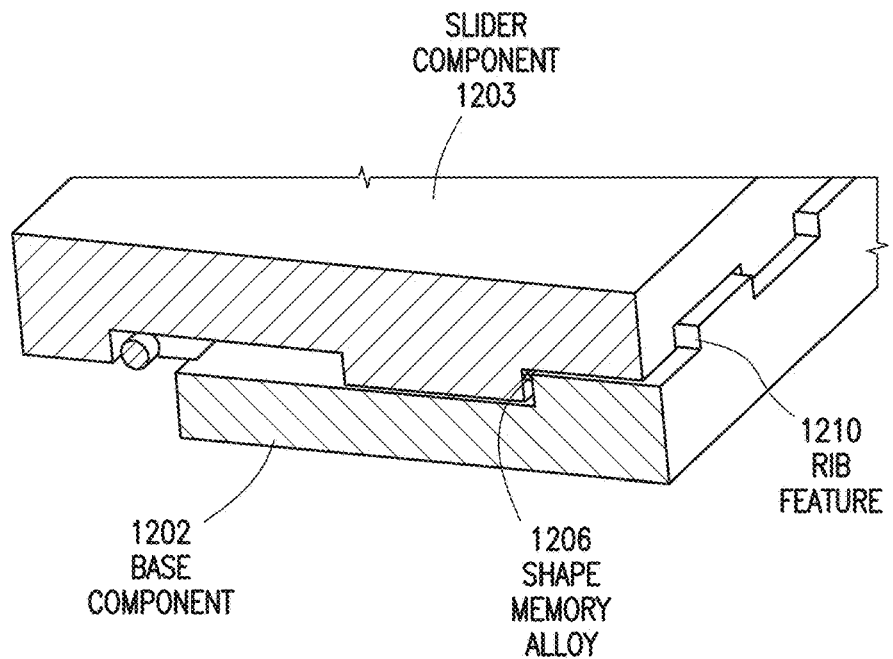
FIG. 12.1
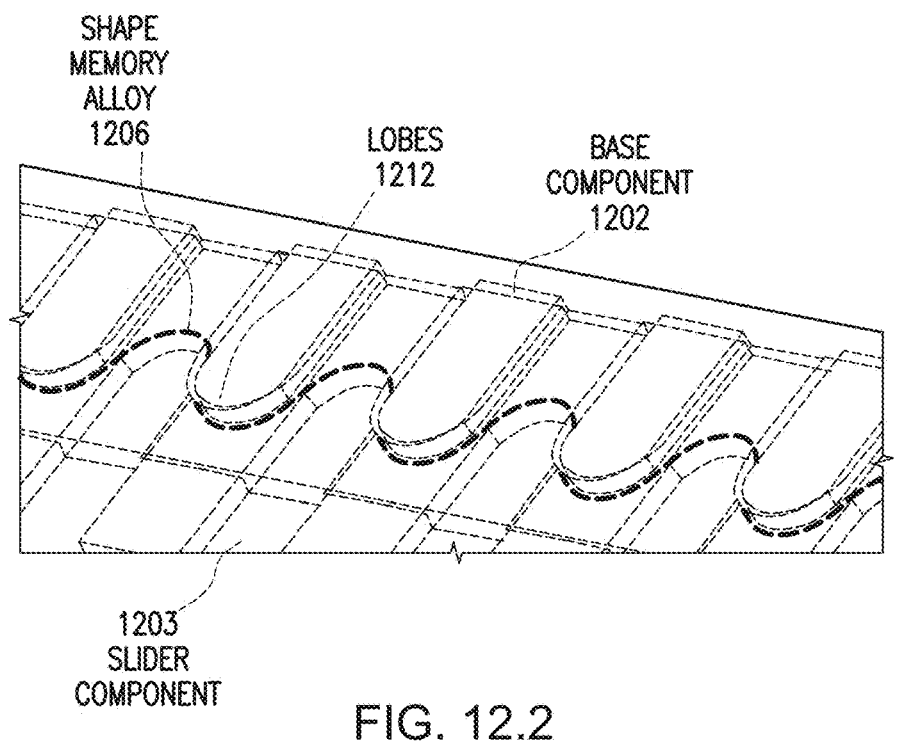
FIG. 12.2

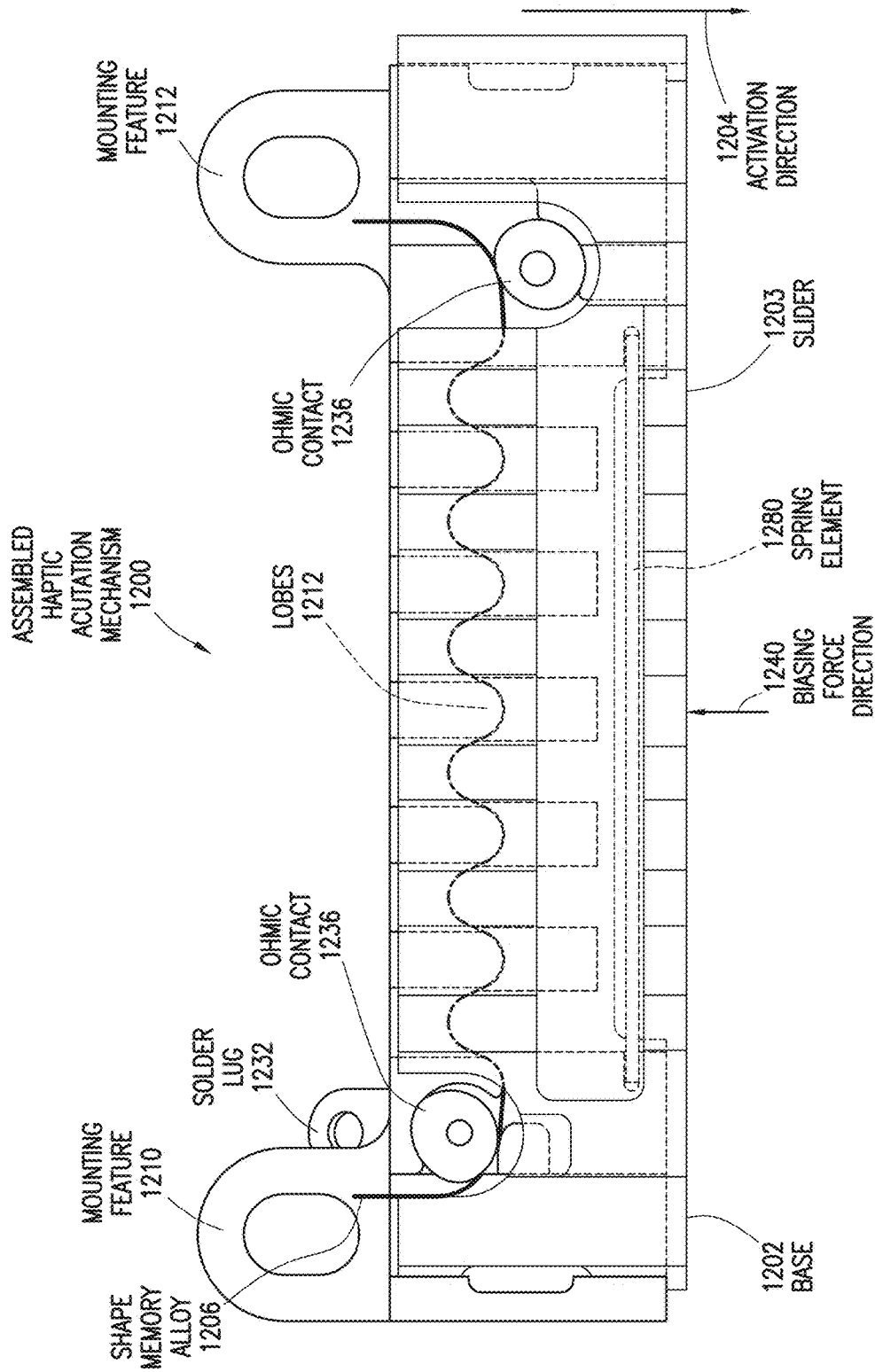
FIG. 12.3

SHAPE MEMORY HAPTIC ACTUATOR DEVICE

FIELD

This invention generally relates to electronic devices.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, embodiments of the invention relate to a haptic actuator. The haptic actuator may include a slider having first interlocking sliding features and a first engagement surface; and a base having second interlocking sliding features and a second engagement surface. The second interlocking sliding features may be configured to engage with the first interlocking sliding features. The haptic actuator may also include a shape memory alloy disposed between the first engagement surface and the second engagement surface; and a pair of ohmic contacts in direct contact with the shape memory alloy. The shape memory alloy may contract and causes displacement of the slider relative to the base from a first position to a second position in response to a current applied to the shape memory alloy through the pair of ohmic contacts.

In general, in one aspect, embodiments of the invention relate to a method of manufacturing a haptic actuator. The method includes forming a slider having first interlocking sliding features and a first engagement surface; forming a base having second interlocking sliding features and a second engagement surface. The second interlocking sliding features may be configured to engage with the first interlocking sliding features. The method may also include disposing a shape memory alloy between the first engagement surface and the second engagement surface; disposing a pair of ohmic contacts through the base; and securing the shape memory alloy to the pair of ohmic contacts. The shape memory alloy may contract and cause displacement of the slider relative to the base from a first position to a second position in response to a current applied to the shape memory alloy through the pair of ohmic contacts.

In general, in one aspect, embodiments of the invention relate to a haptic actuator that includes a slider having a first set of interlocking sliding features and a first engagement surface and a base having a second set of interlocking sliding features and a second engagement surface. In one or more embodiments of the invention, the second set of interlocking sliding features is configured to engage with the first set of interlocking sliding features. In one or more embodiments of the invention, the first set of interlocking sliding features extends toward the second engagement surface and the second set of interlocking sliding features extends toward the first engagement surface. In one or more embodiments of the invention, the haptic actuator also includes a shape memory alloy located between the first engagement surface and the second engagement surface, and a pair of ohmic contacts in direct contact with the shape memory alloy and configured to apply a current to the shape memory allow and cause displacement of the slider relative to the base from a first position to a second position. In one or more embodiments of the invention, the haptic actuator also includes a spring element configured to engage with the base and the slider and provide a return force biasing the slider relative to the base toward the first position.

Other aspects of the invention will be apparent from the following description and the appended claims.

BRIEF DESCRIPTION OF DRAWINGS

FIG. 5.1 shows a cross-sectional view of a haptic actuator before actuation in accordance with one or more embodiments of the invention.

FIG. 5.2 shows a cross-sectional view of a haptic actuator for showing actuator function in accordance with one or more embodiments of the invention.

FIG. 6.1 shows a haptic actuator with a transparent slider in accordance with one or more embodiments of the invention.

FIG. 6.2 shows a haptic actuator with a transparent slider in accordance with one or more embodiments of the invention.

FIG. 6.3 shows a haptic actuator with a transparent slider in accordance with one or more embodiments of the invention.

FIG. 7 shows a perspective view of a haptic actuator base with tabs in accordance with one or more embodiments of the invention.

FIG. 8.1 shows a perspective view of a base of a haptic actuator in accordance with one or more embodiments of the invention.

FIG. 8.2 shows a perspective view of the bottom of a base of a haptic actuator in accordance with one or more embodiments of the invention.

FIG. 8.3 shows a bottom perspective view of a clamping nut in accordance with one or more embodiments of the invention.

FIG. 8.4 shows a top view of a clamping nut in accordance with one or more embodiments of the invention.

FIG. 8.5 shows a perspective view of a base and a clamping nut in accordance with one or more embodiments of the invention FIG. 8.6 shows a top view of a base and a clamping nut in accordance with one or more embodiments of the invention FIG. 9.1 shows a flowchart in accordance with one or more embodiments of the invention.

FIG. 9.2 shows a flowchart in accordance with one or more embodiments of the invention.

FIG. 10.1, FIG. 10.2, FIG. 10.3, FIG. 10.4, and FIG. 10.5 show an example in accordance with one or more embodiments of the invention.

FIG. 12.1 shows a partial perspective view of an assembled haptic actuator in accordance with one or more embodiments of the invention.

FIG. 12.2 shows a partial perspective view of an assembled haptic actuator in accordance with one or more embodiments of the invention.

FIG. 12.3 shows a top view of an assembled haptic actuator in accordance with one or more embodiments if the invention.

DETAILED DESCRIPTION

Figure 1:
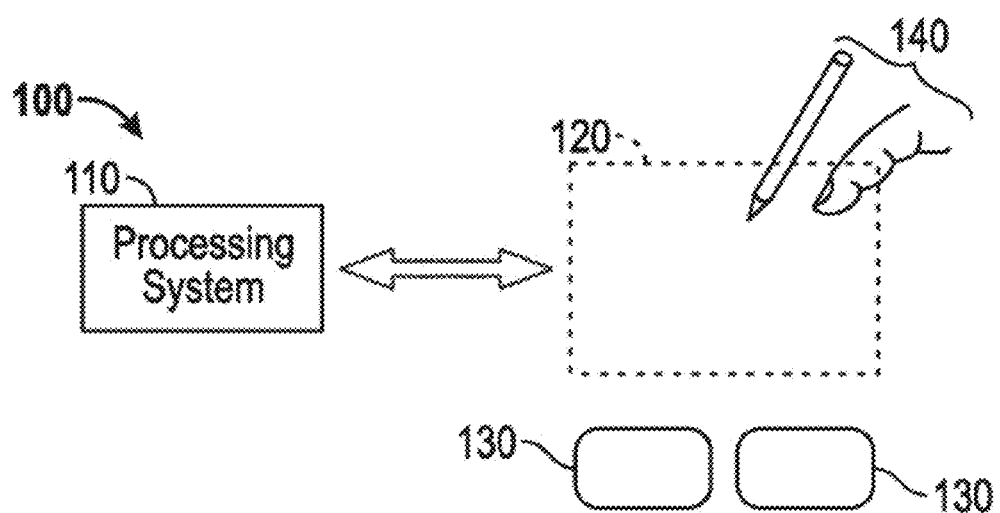
FIG. 1 shows a block diagram of an example system that includes an input device in accordance with an embodiment of the invention.

Specific embodiments of the invention will now be described in detail with reference to the accompanying figures. Like elements in the various figures may be denoted by like reference numerals and/or like names for consistency.

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present invention provide input devices and methods that facilitate improved usability. In particular, one or more embodiments of the invention are directed to providing haptic actuation via a haptic actuator. In various embodiments, the haptic actuation is caused by the application of current to shape memory alloy. Specifically, in one or more embodiments, the application of current to the shape memory alloy causes the temperature of the shape memory alloy to rise, leading to a contraction of the shape memory alloy. The rise in temperature and corresponding contraction of the shape memory alloy may cause the haptic actuation. The shape memory alloy may be included in and/or coupled to the haptic actuator. For example, the shape memory alloy may be disposed between a base and a slider of a haptic actuator. In one or more embodiments, the haptic actuator includes one or more design features that reduce the likelihood that the shape memory alloy will become disengaged, partially or otherwise, from the haptic actuator or a portion thereof.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object may be used. Although the singular form is used, multiple input objects may exist in the sensing region (120). Further, the particular input objects are in the sensing region may change over the course of one or more gestures. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that includes no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and, in various embodiments, the reference voltage may be system ground. In some embodiments, transmitter sensor electrodes may be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators/mechanisms (not shown), etc.

The processing system (110) may be implemented as a set of modules that handle different functions of the processing system (110). Each module may include circuitry that is a part of the processing system (110), firmware, software, and/or a combination thereof. In various embodiments, different combinations of modules may be used. For example, as shown in FIG. 1, the processing system (110) may include a determination module (not shown) and a sensor module (not shown). The determination module may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module may include functionality to drive the sensing elements to transmit transmitter signals and receive the resulting signals. For example, the sensor module may include sensory circuitry that is coupled to the sensing elements. The sensor module may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Alternative or additional modules may exist in accordance with one or more embodiments. Such alternative or additional modules may correspond to distinct modules or sub-modules of one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, haptic actuation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

"Force information" as used herein is intended to broadly encompass force information regardless of format. For example, the force information may be provided for each object as a vector or scalar quantity. As another example, the force information may be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light-emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

It should be understood that while many embodiments are described in the context of a fully-functioning apparatus, the mechanisms of the various embodiments are capable of being distributed as a program product (e.g., software) in a variety of forms. For example, the mechanisms of various embodiments may be implemented and distributed as a software program on information-bearing media that are readable by electronic processors (e.g., non-transitory computer-readable and/or recordable/writable information bearing media that is readable by the processing system (110)). Additionally, the embodiments may apply equally regardless of the particular type of medium used to carry out the distribution. For example, software instructions in the form of computer readable program code to perform one or more embodiments may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments may be implemented on a distributed system having several nodes, where each portion an embodiment may be located on a different node within the distributed system. In one or more embodiments, the node corresponds to a distinct computing device. Alternatively, the node may correspond to a computer processor with associated physical memory. The node may alternatively correspond to a computer processor or micro-core of a computer processor with shared memory and/or resources.

One or more embodiments are directed to an electronic system (not shown). In one or more embodiments, the electronic system includes a housing and an input device configured to determine positional and/or force information from a plurality of input objects in a sensing region. In one or more embodiments, the input device includes a rigid support substrate mechanically coupled to the housing, a force sensor coupled to the rigid support substrate, an input surface disposed above the rigid support substrate, and a coupling element disposed through an opening formed in the rigid support substrate, in which the coupling element is disposed between the housing and the rigid support substrate, and in which the coupling element is configured to allow the rigid support substrate to displace in an activation direction relative to the housing. In one or more embodiments, the electronic system also includes a processing system communicatively coupled to the force sensor and configured to determine positional information and/or force information for the plurality of input objects and to actuate a haptic actuator to translate the rigid support substrate in an activation direction.

While FIG. 1 shows a configuration of components, other configurations may be used without departing from the scope of the invention. For example, various components may be combined to create a single component. As another example, the functionality performed by a single component may be performed by two or more components. Accordingly, for at least the above-recited reasons, embodiments of the invention should not be considered limited to the specific arrangements of components and/or elements shown in FIG. 1.

Figure 2:
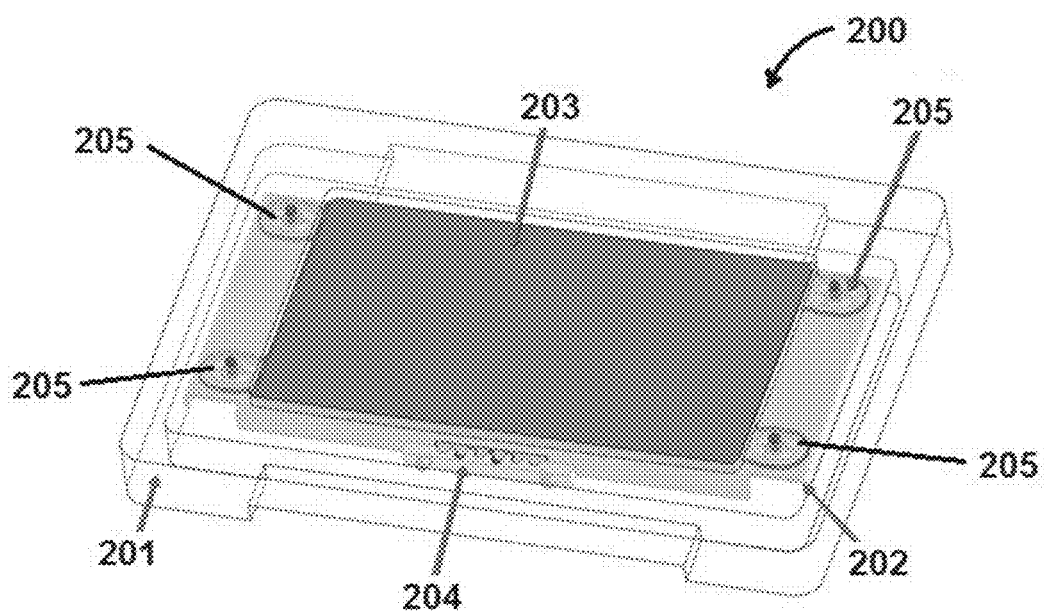
FIG. 2 shows a perspective view of an example input device in accordance with one or more embodiments of the invention.

FIG. 2 shows a perspective view of an example input device (200) in accordance with one or more embodiments. In one or more embodiments, the input device (200) is configured to determine positional and/or force information from one or more input objects in a sensing region. In the exemplary embodiment of an input device shown in FIG. 2, the input device (200) includes a housing (201), a rigid support substrate (202), and an input surface (203). In one or more embodiments, the input surface (203) may be a sensing region. In one or more embodiments, the sensing region may be proximate to one or more sensing electrodes for determining positional information. Additionally or alternatively, the sensing region may be coupled to a force sensor, and the force sensor may be used to determine positional information and/or force information for one or more input objects on the input surface (203). In one or more embodiments, the force sensor includes one or more sensor electrodes and determines force applied by the input objects (e.g., the input objects (140) shown in FIG. 1) on the input surface (203).

In one or more embodiments, the input surface (203) may be disposed above the rigid support substrate (202), and the rigid support substrate (202) may be mechanically coupled to the housing (201) and may include one or more openings. Further, in one or more embodiments, one or more coupling elements (205) may be disposed through the openings of the rigid support substrate (202) and may be disposed between the housing (201) and the rigid support substrate (202). In other words, in one or more embodiments, the coupling elements (205) may be used to mechanically couple the rigid support substrate (202) to the housing (201). In one or more embodiments, each of the coupling elements (205) may be configured to allow the rigid support substrate (202) to displace in an activation direction relative to the housing (201). The activation direction may be any direction relative to the housing. As an example, the activation direction may be on a plane of the input surface (203). As another example, the activation direction may be perpendicular to the plane of the input surface (203).

Further, in one or more embodiments, the input device (200) includes a haptic actuator (204). In one or more embodiments, the haptic actuator (204) may actuate in response to a position and/or force of an input object. Additionally, in one or more embodiments, the haptic actuator may cause actuation for any reason relevant to the conveyance of information to a user of the input device. In one or more embodiments, the haptic actuator (204) may be coupled to the rigid support substrate (202), and actuation of the haptic actuator (204) may result in a force being applied to the rigid support substrate (202) by the haptic actuator (204), (e.g., in the direction of actuation). As will be discussed further below, the coupling elements (205) may be used to allow displacement of the rigid support substrate (202) in an activation direction relative to the housing (201), for example, as a result of actuation via the haptic actuator (204). As shown, in one or more embodiments, the coupling elements (205) may be positioned near corner portions and/or edge portions of the rigid support substrate (202), and openings may be formed in such portions of the rigid support substrate (202), accordingly.

In one or more embodiments, the electronic system also includes a processing system (e.g., the processing system (110) of FIG. 1) configured to determine positional information and/or force information for one or more input objects (e.g., the input objects (140) of FIG. 1) and to actuate the haptic actuator (204) to translate the rigid support substrate (202) in the activation direction.

While FIG. 2 shows a configuration of components, other configurations may be used without departing from the scope of the invention. For example, various components may be combined to create a single component. As another example, the functionality performed by a single component may be performed by two or more components. Additionally, in one or more embodiments, the haptic actuator (204) may be disposed in any location relative to a component (e.g., the rigid support substrate (202)) that may be translated via actuation via the haptic actuator (204). Accordingly, for at least the above-recited reasons, embodiments of the invention should not be considered limited to the specific arrangements of components and/or elements shown in FIG. 2.

Figure 3:
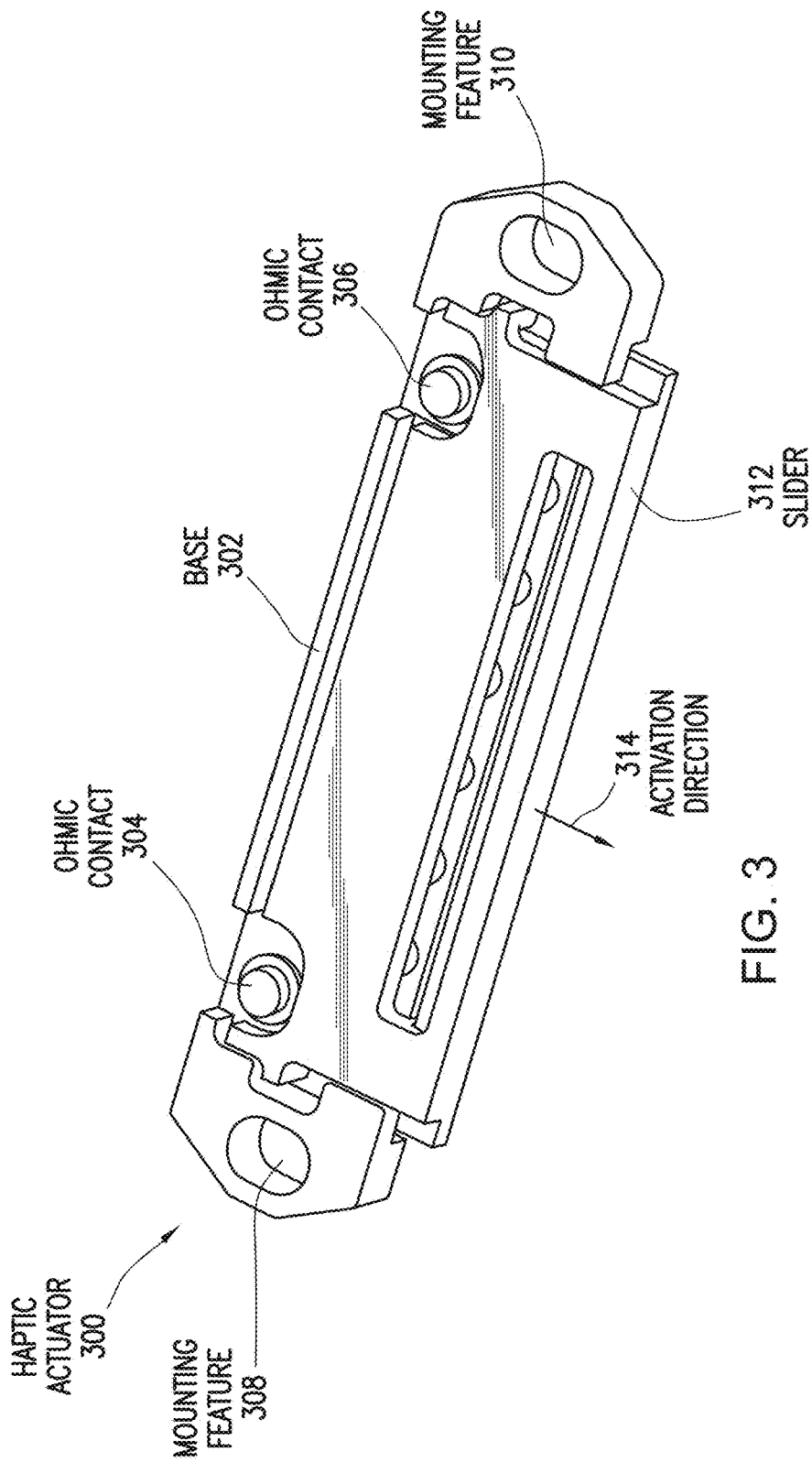
FIG. 3 shows a bottom view of a haptic actuator in accordance with one or more embodiments of the invention.

FIG. 3 shows a bottom view of a haptic actuator in accordance with one or more embodiments of the invention. As shown in FIG. 3, the haptic actuator 300 includes a base (302), one or more mounting features (308 and 310), one or more ohmic contacts (304 and 306), and a slider (312). Each of these components is described below.

In one or more embodiments, the haptic actuator (300) is substantially similar to haptic actuator (204) shown in FIG. 2, as described above. In one or more embodiments, haptic actuator (300) includes a base (302). In one or more embodiments, the base (302) may be formed from any rigid material (e.g., a metal such as aluminum). Additionally, the base (302) may be coated (e.g., anodized to create a thin layer of non-conductive aluminum oxide) such that the base (302) is not electrically conductive, but is thermally conductive. For example, a base made from aluminum may be thermally conductive, but may have a surface that is not electrically conductive once the aluminum base is anodized. In one or more embodiments, the thermal conductivity of the base (302) provides for heat dissipation from the haptic actuator (300). For example, the thermal conductivity of the base may provide for heat dissipation from the shape memory alloy (discussed in the description of FIG. 4, below). In the embodiment shown in FIG. 3, the base (302) has a length that is longer than the width, and a thickness that is less than either the length or width. In such embodiments, the relatively small thickness contributes to a haptic actuator (300) having a low profile. For example, the total thickness may be between two millimeters and three millimeters. One having ordinary skill in the art and the benefit of this Detailed Description will appreciate that the shape, length, and/or width of the haptic actuator (300) may vary from embodiments such as the one shown in FIG. 3 without departing from the scope of the invention.

In one or more embodiments, the base (302) includes one or more mounting features (e.g., 308 and 310). The one or more mounting features (308 and 310) may be any shape and/or any location in or on the base (302) that allows the haptic actuator (300) to be mounted on to or assembled as part of a device (e.g., input device (200) of FIG. 2) or any other component. In the embodiment shown in FIG. 3, one mounting feature (308 and 310) is located at each end of the length of the base (302) and each mounting feature has a generally oval shape that extends through the base (302). The mounting features (308 and 310) may be used, for example, by inserting screws (not shown) or other attaching elements (not shown) through the mounting features (308 and 310) to affix the haptic actuator (300) to a device.

In one or more embodiments, the base may include one or more holes (not shown) for mounting one or more ohmic contacts (304 and 306). An ohmic contact (304 and 306) may be any contact surface that is electrically conductive (i.e., through which current may pass). As an example, the ohmic contacts (304 and 306) may be constructed, at least in part, of a metal such as copper. In one or more embodiments, the ohmic contacts (304 and 306) are affixed (e.g., glued) to the base such that the ohmic contacts (304 and 306) pose less risk of accidentally scratching the base (302), which may affect the electrical isolation of the base (302). In one or more embodiments, the ohmic contacts (304 and 306) are disposed within cavities (not shown) of the base (302), which may or may not extend through the entire base. Disposition within the cavities may allow the ohmic contacts (304 and 306) to be affixed to the base (302), and to a shape memory alloy (discussed in the description of FIG. 4, below). Ohmic contacts are discussed further in the description of FIG. 4, below.

In one or more embodiments, the haptic actuator (300) includes a slider (312). Similar to the base (302), in one or more embodiments, the slider (312) may be formed from any rigid material (e.g., a metal such as aluminum). Additionally, the slider (312) may be coated (e.g., anodized) such that the slider (312) is not electrically conductive, but is thermally conductive. For example, a slider made from aluminum may be thermally conductive, but may have a surface that is not electrically conductive once the aluminum slider is anodized. In one or more embodiments, the thermal conductivity of the slider (312) provides for additional heat dissipation from the haptic actuator (300). For example, the thermal conductivity of the slider may provide for additional heat dissipation from the shape memory alloy (discussed in the description of FIG. 4, below). In one or more embodiments, the slider (312) is constructed from the same material as the base (302). In other embodiments, the slider (312) is constructed from a different material than the base (302).

In one or more embodiments, the slider (312) is disposed as at least a partial sheath that covers at least a portion of the base (302). Such a coupling may allow the base (302) and the slider (312) to have engagement surfaces in which a shape memory alloy (discussed below in the description of FIG. 4) may be disposed. Disposition of the shape memory alloy between an engagement surface of the base (302) and an engagement surface of the slider (312) may reduce the chance of unwanted translation of the shape memory alloy relative to the haptic actuator. For example, in embodiments such as that shown in FIG. 3, the shape memory alloy (not shown) is within the sheath of the slider (312), and therefore is less likely to translate away from the haptic actuator (300).

The base (302) and slider (312) of the haptic actuator may be coupled such that the base and the slider are interlocked, but allow for translation of the slider (312) relative to the base (302) in at least one direction. For example, FIG. 3 shows an embodiment in which the base (302) and the slider (312) are interlocked such that the slider may translate relative to the base in the activation direction (314). Interlocking sliding features of the slider and the base are discussed further in the description of FIG. 5.1, below.

While FIG. 3 shows a configuration of components of a haptic actuator, other configurations may be used without departing from the scope of the invention. For example, various components may be combined to create a single component. As another example, the functionality performed by a single component may be performed by two or more components. Additionally, in one or more embodiments, the haptic actuator (300) may include components and/or elements disposed in different locations relative to one another than are shown in FIG. 3. For example, the slider and the base may be interlocked in a manner that allows for movement in a direction other than the activation direction shown in FIG. 3. As another example, the ohmic contacts may be located at a different location on the base, or on the slider. As another example, in one or more embodiments, the base (302) may be formed as an integral part of the rigid support substrate (202). For example, the rigid support substrate (202) may be machined and/or formed to include the features of the base (302) of the haptic actuator. In such embodiments, the cost of manufacturing and/or assembly of the input device (200) may be reduced. Accordingly, for at least the above-recited reasons, embodiments of the invention should not be considered limited to the specific arrangements of components and/or elements shown in FIG. 3.

Figure 4:
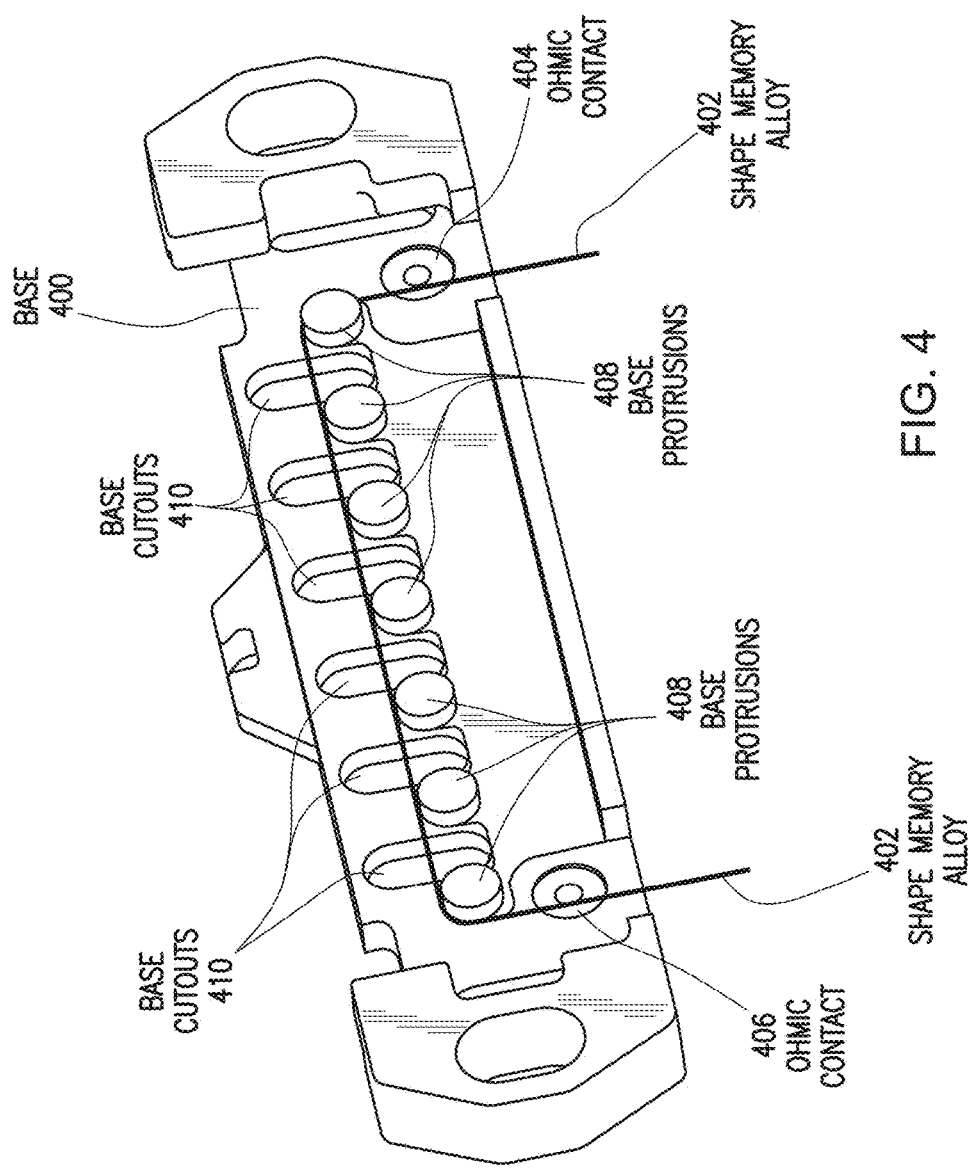
FIG. 4 shows a perspective view of a base portion of a haptic actuator in accordance with one or more embodiments of the invention.

FIG. 4 shows perspective view of a base portion of a haptic actuator in accordance with one or more embodiments of the invention. As shown in FIG. 4, the base portion of haptic actuator (300) of FIG. 3 is shown without the slider portion so as to reveal additional components of at least some embodiments of a haptic actuator. Accordingly, the embodiment shown in FIG. 4 includes the base (400), a shape memory alloy (402), ohmic contacts (404 and 406), base protrusions (408), and base cutouts (410). Each of these components is described below.

In one or more embodiments, the base (400) is substantially similar to the base (302) discussed above in the description of FIG. 3, but with additional components of the haptic actuator shown that are covered (i.e., sheathed) by the slider (312) shown in FIG. 3. One such additional component is a shape memory alloy (402). The shape memory alloy (402) may be any electrically conductive material that increases in temperature (i.e., is heated) when current is passed through, and which contracts when the temperature increases past a transition temperature of the alloy. In one or more embodiments of the invention, when the shape memory alloy cools, it returns to its uncontracted state. The heating and cooling of the shape memory alloy (402) may provide for actuation of the haptic actuator (400). As will be discussed below in the description of FIGS. 6.1-6.3, the actuation may be aided by a spring (e.g. spring element 650 of FIG. 6.2). In embodiments such as that shown in FIG. 4, the shape memory alloy (402) may be formed in a wire or ribbon shape and disposed over base protrusions (408, discussed below). Examples of alloys from which the shape memory alloy (402) may be formed include, but are not limited to, a nickel-titanium alloy and a copper-aluminum-nickel alloy.

In one or more embodiments, the base (400) includes base protrusions (408) formed on and/or coupled to a portion of the base (400) that engages with the slider (312) shown in FIG. 3. A surface of the base (400) which engages with the slider (e.g., slider 312 of FIG. 3) may be referred to as an engagement surface, and a surface of a slider that engages with the base may also be referred to as an engagement surface (e.g., a slider may have a first engagement surface and a base may have a second engagement surface). In one or more embodiments, the base protrusions (408) are formed as a portion of the base (400). In other embodiments, the base protrusions (408) are formed separately from and coupled to the base (400). The base protrusions (408) may extend from an engagement surface of the base (400). In one or more embodiments, the base protrusions (408) extend orthogonally from an engagement surface of the base (400). The base protrusions (408) may each be substantially round in shape (as shown in FIG. 4), or may be any other shape without departing from the scope of the invention.

In one or more embodiments, the base protrusions (408) are located such that the shape memory alloy (402) rests on the base protrusions (408). In such embodiments, during assembly of the haptic actuator, before the slider is interlocked with the base (400), the shape memory alloy (402) may rest on the base protrusions (408) at least partially as a result of tension applied to distal ends of the shape memory alloy (402). Additionally, during and/or after assembly of the haptic actuator, the base (400) may be disposed at an angle such that the shape memory alloy (402) rests more securely on the base protrusions (408) than if the base (400) were disposed either vertically or horizontally. In one or more embodiments, the resting position of the shape memory alloy (402) may be one position (i.e., an original position) of the shape memory alloy before a deformation of the shape memory alloy that occurs when the base (400) and slider become interlocked, placing the shape memory alloy (402) in a different position. Deformation of the shape memory alloy is discussed further in the description of FIG. 5.1, below.

In one or more embodiments, the base (400) include base cutouts (410) formed in an engagement surface of the base. The base cutouts (410) may extend into an engagement surface of the base (400). In one or more embodiments, the base cutouts (410) are located between the base protrusions (408). In one or more embodiments, the base cutouts (410) include a larger area than the base protrusions (408). For example, in embodiments such as that shown in FIG. 4, the base protrusions (408) are each substantially round, and the base cutouts (410), located between the base protrusions, are longer shapes that end on both sides in a semicircle shape. However, the base protrusions (408) may have different shapes than circular, for example square, elliptical or other shapes may be used. In one or more embodiments of the invention, the base cutouts (410) are sized such that they may at least partially house slider protrusions (not shown), and allow for the slider protrusions to translate in an activation direction (e.g., in the activation direction (314) shown in FIG. 3).

In one or more embodiments of the invention, as discussed above in the description of FIG. 3, the haptic actuator includes ohmic contacts (404 and 406). The ohmic contacts (404 and 406) may be substantially similar to ohmic contacts (304 and 306) shown in FIG. 3. As shown in FIG. 4, the ohmic contacts (404 and 406) are configured to couple with the shape memory alloy (e.g., via a screw and washer (not shown)). In one or more embodiments, the coupling of the ohmic contacts (404 and 406) with the shape memory alloy (402) allows for a current to be passed through the shape memory alloy via the ohmic contacts. In embodiments in which the ohmic contacts (404 and 406) form a part of the base (400), the ohmic contacts mechanically couple the shape memory alloy (402) to the base. For example, the ohmic contacts may secure distal ends of the shape memory alloy to the base. In embodiments in which the ohmic contacts (404 and 406) form part of the slider (not shown in FIG. 4), the ohmic contacts may couple the shape memory alloy to the slider. Examples of how the shape memory alloy may be coupled to an ohmic contact include, but are not limited to: a screw and washer; and soldered wires.

While FIG. 4 shows a configuration of at least some components of a haptic actuator, other configurations may be used without departing from the scope of the invention. For example, various components may be combined to create a single component. As another example, the functionality performed by a single component may be performed by two or more components. Additionally, in one or more embodiments, the haptic actuator may include components and/or elements disposed in different locations relative to one another than shown in FIG. 4. For example, the base cutouts may be configured to allow for movement in a direction other than the activation direction shown in FIG. 3. As another example, the ohmic contacts may be located at a different location on the base, or on the slider. Accordingly, for at least the above-recited reasons, embodiments of the invention should not be considered limited to the specific arrangements of components and/or elements shown in FIG. 4.

FIG. 5.1 shows a cross-sectional view of a haptic actuator in accordance with one or more embodiments of the invention. As shown in FIG. 5.1, the haptic actuator (500) includes a base (502), a slider (504), a shape memory alloy (506), two ohmic contacts (508 and 510), a spring element (512), and a base spring engagement (514). Each of these components is described below.

In one or more embodiments of the invention, haptic actuator (500) is substantially similar to haptic actuator (300) discussed above in the description of FIG. 3. Additionally, the base is substantially similar to base (302) discussed above in the description of FIG. 3 and further described above as base (400) in the description of FIG. 4. Further, slider (504) is substantially similar to slider (312) discussed above in the description in FIG. 3 and the shape memory alloy (506) is substantially similar to shape memory alloy (402) discussed above in the description of FIG. 4. Also, ohmic contacts (508 and 510) are substantially similar to ohmic contacts (304 and 306) discussed above in the description of FIG. 3 and ohmic contacts (404 and 406) discussed above in the description of FIG. 4.

In one or more embodiments, the spring element (512) is any object of any material that is capable of storing mechanical energy which, when the spring element is deflected from a resting position, exerts a force in an attempt to return to the resting state. In one or more embodiments, the force a spring element (512) may apply may be proportional to the amount of deflection the spring element undergoes. In various embodiments, such as the embodiment shown in FIG. 5.1, the spring element (512) is coupled to the slider (504), with distal ends of the spring element secured within portions of the slider, and the remainder of the spring element disposed within an opening in the slider.

In one or more embodiments, the base (502) includes a base spring engagement (514). In one or more embodiments, the base spring engagement (514) is formed as a part of the base (502) and extends from the base in the same direction as the activation direction (518). In one or more embodiments, the base spring engagement (514) is any extension of the base that may be coupled to the spring element (512). In various embodiments, such as the embodiment shown in FIG. 5.1, the base spring engagement (514) extends from the base (502) in an opening of the slider (504) and couples with a central portion of the spring element (512). In one or more embodiments, the spring element (512) is in a resting position when the slider (504) and the base (502) are engaged as shown in FIG. 5.1. Deflection of the spring from the resting position (e.g., when current is applied to the shape memory alloy) is discussed further in the description of FIGS. 6.1-6.3, below. In one or more embodiments, the spring element (502) provides a bias force to hold the base (502) and slider (504) together in an assembled configuration (as shown) and/or provide a return force after actuation of the haptic actuator.

FIG. 5.2 shows a cross-sectional view of a haptic actuator in accordance with one or more embodiments of the invention. The haptic actuator shown in FIG. 5.2 may be substantially similar to the haptic actuator shown in FIG. 5.1, including a base, a slider, a shape memory alloy, ohmic contacts, a base spring engagement, and a spring element, each of which are shown, but not labeled for the sake of clarity. Additionally, FIG. 5.2 shows slider protrusions (550) and wire contact locations (552). In one or more embodiments of the invention, the base protrusions (not labeled) lie between the wire contact locations (552). The wire contact locations (552) may serve as a stop (i.e., a travel limiter) for the return position of the actuator and help prevent overstressing of the shape memory alloy wire (506).

In one or more embodiments, the slider includes slider protrusions (550) formed on and/or coupled to an engagement surface of the slider. In one or more embodiments, the slider protrusions (550) are formed as a portion of the slider. In other embodiments, the slider protrusions (550) are formed separately from and coupled to the slider. In one or more embodiments, the slider protrusions (550) extend orthogonally from an engagement surface of the slider. The slider protrusion (550) may each be substantially round in shape (not visible in FIG. 5.2), and include an exterior portion coupled with the slider (as shown in FIG. 5.2), or may be any other shape without departing from the scope of the invention. In one or more embodiments, the slider protrusions (550) are configured to be at least partially within base cutouts (e.g., 410 of FIG. 4) when the slider and the base are interlocked, and are therefore located between the base protrusions.

In one or more embodiments, when the base and the slider are interlocked, and no haptic actuation is occurring, the slider protrusions are located at least partially within the base cutouts and substantially aligned with the base protrusions such that the shape memory alloy is "threaded" between the slider protrusions (550) and base protrusions (e.g. 408 of FIG. 4). When assembled together, the base (502) and slider (504) may pull the shape memory alloy (506) into the threaded position with little to no deformation of the wire (0-5%) and contact the base protrusions and the slider protrusions, as shown in FIG. 5.2 as wire contact locations (552). In one or more embodiments of the invention, during assembly, the shape memory alloy (e.g., 506 in FIG. 5.1) has a tension applied that pre-strains the wire in its resting state. The spring element (e.g., 512 of FIG. 5.1) returns the actuator to the resting state after actuation.

While FIG. 5.1 and FIG. 5.2 show a configuration of at least some components of a haptic actuator, other configurations may be used without departing from the scope of the invention. Accordingly, embodiments of the invention should not be considered limited to the specific arrangements of components and/or elements shown in FIG. 5.1 and FIG. 5.2.

FIG. 6.1, FIG. 6.2, and FIG. 6.3 show a cross-sectional view of a haptic actuator with a transparent slider in accordance with one or more embodiments of the invention. The slider is shown as transparent in FIG. 6.1 in order to more clearly show certain components of various embodiments, and in FIG. 6.2 and FIG. 6.3 in order to show an example of the actuation of the haptic actuator. The haptic actuator shown in FIG. 6.1 FIG. 6.2, and FIG. 6.3 is substantially similar to that discussed as haptic actuator (300) in FIG. 3, and further discussed in the description of FIG. 4, FIG. 5.1, and FIG. 5.2. As such, components of the haptic actuator, including the base, mounting features, slider, shape memory alloy, ohmic contacts, spring element, base spring engagement, base protrusions, base cutouts, and slider protrusions, are shown and discussed, but unlabeled for the sake of clarity.

Turning to FIG. 6.1, FIG. 6.1 shows and embodiment of a haptic actuator after the base and the slider have interlocked, but before the spring element is coupled with the base spring engagement.

In one or more embodiments, the haptic actuator includes interlocking sliding features (600 and 602) of the base and the slider, respectively. In various embodiments, such as the embodiment shown in FIG. 6.1, the interlocking sliding features (600 and 602) are configured to interlock the base and slider and allow translation of the slider relative to the base in an activation direction (604). A portion of the interlocking sliding features (600) may be formed from the base and other portions of the interlocking sliding features (602) may be formed from the slider. The interlocking sliding features (600) of the base and the interlocking sliding features (602) of the slider may be configured such that they are keyed with various cutout portions allowing the slider to interlock with the base.

In one or more embodiments, before the spring is engaged with the base spring engagement, the shape memory alloy is in an original position before deformation of the shape memory alloy occurs. Therefore, the shape memory alloy may be disposed over the base protrusions, and under the slider protrusions, with the slider protrusions at the top of the base cutouts, as in the embodiment shown in FIG. 6.1. In one or more embodiments, once the slider is interlocked with the base, the slider acts as a sheath that reduces the possibility that the shape memory alloy will translate (i.e., move) in a manner such that the shape memory alloy disengages with the base protrusions or the slider protrusions.

FIG. 6.2 and FIG. 6.3 show an example of actuation of a haptic actuator in accordance with one or more embodiments of the invention. The following example is for explanatory purposes only and not intended to limit the scope of the invention.

Referring to FIG. 6.2, consider a haptic actuator in which a base has been interlocked with a slider via engagement of a spring element (650) with a base spring engagement (652), as shown. Once the base spring engagement (652) and the spring element (650) have been coupled, the spring element, which is also coupled to the slider, exerts a force on the slider such that the slider translates in a direction away from the activation direction (654). The translation of the slider caused by the spring element (650) results in the slider protrusions moving downward in the base cutouts until the slider protrusions are substantially aligned with the base protrusions. However, in other embodiments, the base cutout and slider protrusions could be staggered relative to each other, extend past one another, or the like. The arrangement of the cutouts and protrusions will determine the actuation distance of the actuator. Contraction of the shape memory alloy causes the base protrusions and the slider protrusions in contact with the shape memory alloy to move relative to one another. In one or more embodiments, once deformed, the shape memory alloy may be any shape. For example, in embodiments such as that shown in FIG. 6.2, the shape of the shape memory alloy is a wave-like shape. In such embodiments, the wave-like shape allows the shape memory alloy to function similar to a number of pulleys when actuation occurs (discussed further in the description of FIG. 6.3 below). The amount of force that is applied when actuation occurs may be related to the number of peaks of the wave-like shape. Also, the size (peak to peak) of the wave-like shape may determine the distance the slider translates relative to the base during actuation.

Referring to FIG. 6.3, consider a scenario in which a current has been applied to the shape memory alloy (686) via the ohmic contacts (682 and 684). In such a scenario, the shape memory alloy (686) increases in temperature due to the current, and therefore contracts. In one or more embodiments, the contraction of the shape memory alloy (686) creates enough force on the surfaces of the base protrusions and the slider protrusions to translate the slider protrusions towards the top of the base cutouts and overcome the preload force of the spring element (680). The translation of the slider may be referred to as actuation of the haptic actuator, which causes the spring element to displace, thereby becoming the displaced spring element (680) shown in FIG. 6.3. Said another way, in one or more embodiments, the contraction of the shape memory alloy results in a force on the slider and an actuation of the slider relative to the base, overcoming the preload force of the spring element, causing the spring element to become a displaced spring element (680) In one or more embodiments, once current is removed from the shape memory alloy (686), the shape memory alloy's temperature reduces below a transition temperature, resulting in the shape memory alloy becoming extended again (as shown in FIG. 6.2) as the resulting spring force due to displacement on the slider by the displaced spring element (680). In one or more embodiments, the thermal properties of the base and slider allow the shape memory alloy (686) to rapidly heat and contract (causing actuation) and rapidly cool (e.g., in 10 ms) by acting as a heat sink. In one or more embodiments, increasing the surface area of contact between the slider, base and the shape memory alloy (686), and/or increasing the volute of thermally conductive material, provides for quick heat dissipation from the shape memory alloy, reducing its contraction time and thus the return of the slider relative to the base (with the aid of the spring element 680).

It should be noted, that the actuation in FIG. 6.3 is an extreme example, as the base and slider components are separated by a distance exceeding a typical actuation scenario. In other words, the shape memory alloy (686) as shown is "straight" which is outside of the design parameters of one or more embodiments of a haptic actuator. In some embodiments, FIG. 6.3 shows a pre-assembled examples of the haptic actuator where the spring element (680) will bias the base and slider components together.

While FIG. 6.1, FIG. 6.2, and FIG. 6.3 show a configuration of at least some components of a haptic actuator, other configurations may be used without departing from the scope of the invention. Accordingly, embodiments of the invention should not be considered limited to the specific arrangements of components and/or elements shown in FIG. 6.1, FIG. 6.2, and/or FIG. 6.3.

FIG. 7 shows a perspective view of a haptic actuator having a base with tabs in accordance with one or more embodiments of the invention. As shown in FIG. 7, the haptic actuator (700) includes a slider (702), a base (704), ohmic contacts (706 and 708), mounting features (710 and 712), and one or more side tabs (714 and 716). Each of these components in described below.

In one or more embodiments, the base (704) may be formed from any rigid material (e.g., a metal such as aluminum). Additionally, the base (704) may be coated (e.g., anodized) such that the base (704) is not electrically conductive, but is thermally conductive. For example, a base made from aluminum may be thermally conductive, but not electrically conductive once the aluminum base is anodized. In one or more embodiments, the thermal conductivity of the base (704) provides for heat dissipation from the haptic actuator.

In one or more embodiments, the base (704) includes one or more mounting features (e.g., 710 and 712). The one or more mounting features (710 and 712) may be any shape and/or any location in or on the base (704) that allows the haptic actuator (700) to be mounted on to or assembled as part of a device (e.g., input device (200) of FIG. 2) or any other component. In the embodiment shown in FIG. 7, the mounting features (710 and 712) are located at either end of the length of the base (704) and have a generally round shape that extends through the base (704). The mounting features may be used, for example, by inserting screws (not shown) or other attaching elements (not shown) through the mounting features (710 and 712) to affix the haptic actuator (700) to a device.

In one or more embodiments, the base may include one or more holes for mounting one or more ohmic contacts (706 and 708). An ohmic contact (706 and 708) may be any contact surface that is electrically conductive (i.e., through which current may pass). As an example, the ohmic contacts (706 and 708) may be constructed of a metal such as copper. In one or more embodiments, the ohmic contacts (706 and 708) are affixed (e.g., glued) to the base (704) such that the ohmic contacts pose less risk of accidentally scratching the base, which may affect the electrical isolation of the base. In one or more embodiments, the ohmic contacts (706 and 708) are disposed at least partially within cavities, which may or may not extend through the entire base (704), that allow the ohmic contacts (706 and 708) to be affixed to the base, and to a shape memory alloy.

In one or more embodiments, the haptic actuator includes a slider (702). FIG. 7 shows the partial slider as transparent for the sake of clarity, however one having ordinary skill in the art and the benefit of this detailed description will appreciate that various embodiments of the invention do not have a transparent slider and/or that the slider may have more features than those shown. Similar to the base (704), in one or more embodiments, the slider (702) may be formed from any rigid material (e.g., a metal such as aluminum). Additionally, the slider (702) may be coated (e.g., anodized) such that the slider (702) is not electrically conductive, but is thermally conductive. For example, a movable slider made from aluminum may be thermally conductive, but not electrically conductive once the aluminum slider is anodized. In one or more embodiments, the thermal conductivity of the slider (702) provides for additional heat dissipation from the haptic actuator, or any portion thereof (e.g., a shape memory alloy). In one or more embodiments, the movable is constructed from the same material as the base. In other embodiments, the slider (702) is constructed from a different material than the base (704). The base and slider of the haptic actuator may be coupled to allow for translation of the slider relative to the base in at least one direction (e.g., activation direction (718)). The surface of the slider and the base that are at least periodically coupled to one another may be referred to as engagement surfaces.

Although not shown in FIG. 7, the embodiment of a haptic actuator in FIG. 7 has a shape memory alloy in a wire shape disposed between the slider (702) and the base (704) and secured at distal ends to the ohmic contacts (706 and 708), allowing for application of current to the shape memory alloy. As discussed above in the description of FIG. 4, the shape memory alloy may be any electrically conductive material in any shape that increases in temperature (i.e., is heated) when current is passed through, and which contracts when the increase in temperature occurs. For example, the shape memory alloy may, when subjected to a deformation, return, when heated via current flow, to a shape closer to the original shape of the shape memory alloy. In embodiments such as that shown in FIG. 7, the shape memory alloy may be formed in a wire shape or the shape of a ribbon. Examples of alloys from which the shape memory alloy may be formed include, but are not limited to, a nickel-titanium alloy and a copper-aluminum-nickel alloy. In one or more embodiments of the invention, application of current to the shape memory alloy in embodiments of a haptic actuator such as that shown in FIG. 7 cause the shape memory alloy to contract, thereby exerting force on engagement surfaces the base (704) and slider (702). The force may cause the translation of the slider (702) in the activation direction (718).

In one or more embodiments, the haptic actuator (700) includes one or more side tabs (714 and 716). The side tabs (714 and 716) may be formed as part of the base (704), (as shown in FIG. 7) and/or as part of the slider (702) (not shown in FIG. 7). In one or more embodiments, the inclusion of side tabs (714 and 716) restricts the displacement of the shape memory alloy (not shown) such that the shape memory alloy is less likely to become disengaged from the haptic actuator (700) and/or the engagement surfaces of the base (704) and the slider (702). In one or more embodiments, the side tabs are located at the peak of the protrusions, which may increase the effectiveness of the side tabs.

While FIG. 7 shows a configuration of at least some components of a one embodiment of a haptic actuator, other configurations may be used without departing from the scope of the invention. Accordingly, embodiments of the invention should not be considered limited to the specific arrangements of components and/or elements shown in FIG. 7.

FIG. 8.1 shows a perspective view of a base (802) of a haptic actuator in accordance with one or more embodiments. In embodiments such as that shown FIG. 8.1, the base (802) includes mounting features (810 and 812), and pocket features (820 and 822) having a chamfer (824 and 825). In one embodiment, the pocket features (820 and 822) comprise a circular profile and a clamping surface (821 and 823). The pocket features are configured such that tightening of the shape memory alloy (806) with a fastening mechanism (not shown) wedges the shape memory alloy (806) between the cam profile of the fastening mechanism and the clamping surface (823 and 821) of the base. Additionally, the chamfers (824 and 825) in the pocket features (820 and 822) may minimize the chance of burrs from ohmically coupling the base and the fastening mechanism, which must remain ohmically isolated.

FIG. 8.2 shows a perspective view of the bottom of the base (802) of a haptic actuator in accordance with one or more embodiments. In embodiments of the invention such as that shown in FIG. 8.2 the base (802) includes the mounting features (810 and 812) along with one example of at least a portion of a fastening mechanism (830 and 832) in the form of a screw. In one embodiment, the fastening mechanism also includes a washer (834). The washer (834) may prevent scratching of an anodizing coating on the base during assembly and fastening of the shape memory alloy (806) to the base (802). In some embodiments, one of fastening mechanisms comprises a solder lug (836) instead of or in addition to a washer. The solder lug (836) may be desirable wherein ohmic contact to the shape memory alloy (806) is made by ohmically coupling the processing system (not shown) to the shape memory alloy (806) through the fastening mechanism (832).

FIGS. 8.3 and 8.4 show a bottom perspective and top view of a clamping nut (836) of the fastening mechanisms (e.g., fastening mechanisms 830 and 832 of FIG. 8.2) in accordance with one or more embodiments. FIG. 8.3 shows a matching chamfer (838) configured to eliminate contact and burrs in the area of the chamfers (e.g., chamfers 824 and 825 of FIG. 8.1) of the base, reducing any buffing which may occur as a result of assembly. FIG. 8.4 shows the matching circular and cam profile (840) configured to match with the circular profile of the pocket features (e.g., pocket features 820 and 822 of FIG. 8.1) and clamping surface (821 and 823 of FIG. 8.1) of the base (802), respectively. In one embodiment, the clamping nut (836) is attached to a fastening mechanism (e.g., fastening mechanisms 830 and 832 of FIG. 8.2) in the form of a screw via the threaded hole (850). Rotation of the clamping nut (836) in the pocket features (820 and 822) may secure the shape memory alloy (806) and the clamping nut (834) against the pocket features (820 and 822) while also minimizing sharp edges in contact with the shape memory alloy (806), reducing stress concentration on the shape memory alloy (806) which may result from fastening the shape memory alloy (806) to the base (802). The geometry of the clamping surface (821 and 823 of FIG. 8.1) on the base (802) and the matching cam profile (840) on the clamping nut (836) may provide no sharp edges in contact with the shape memory alloy (806), reducing stress concentration on the shape memory alloy (806) help to avoid the chance of sharp edges and burrs due to processing creating scratches in the aluminum anodizing which may short out which may result from fastening the shape memory alloy (806) to the base (802), potentially rendering the actuator non-functional. In various embodiments, the clamping nut (836) is fabricated at least partially using a softer material (e.g., copper or brass) than a material of the base (802) (e.g., anodized aluminum) to prevent damage of the base and further reduce stress concentrations on the shape memory alloy (806 of FIG. 8.5).

FIGS. 8.5 and 8.6 shows a perspective view and a top view of a base (802) and a clamping nut (836) in accordance with one or more embodiments of the present invention. As shown in FIG. 8.5, the clamping nut (836) is rotated in the pocket feature (820) of the base (802) to secure the shape memory alloy (806) to the base (802). As shown in FIG. 8.6 the clamping nuts (836) are positioned by the pocket feature (820 and 822) geometry and secure the shape memory alloy (806) against the clamping surface (821 and 823 of FIG. 8.1) due to the threading action of the fastening mechanism (830 and 832) which rotates the clamping nuts (836), wedging the shape memory alloy (806) between the cam profile and clamping surface (821 and 823 of FIG. 8.1). While FIGS. 8.1-8.6 show a configuration of at least some components of various embodiments of a haptic actuator, other configurations may be used without departing from the scope of the invention. Accordingly, embodiments of the invention should not be considered limited to the specific arrangements of components and/or elements shown in FIGS. 8.1-8.6.

Turning to FIG. 9.1, FIG. 9.1 shows a method for manufacturing a haptic actuator in accordance with one or more embodiments. In Step 900, a slider is formed having interlocking sliding features and an engagement surface. The interlocking sliding features of the slider may be keyed with various cutout portions (e.g., alignment notches) allowing the slider to interlock with the base. In one or more embodiments, the slider is made from a rigid material. For example, the slider may be formed from aluminum. The slider may be anodized such that the slider is thermally conductive but not electrically conductive. In one or more embodiments, one or more slider protrusions are also formed as part of the slider. The slider protrusions may be orthogonal to the engagement surface of the slider. In one or more embodiments, forming the slider includes forming a slot in the slider in which a spring element is disposed. The spring element may be configured to engage with a portion of the base (e.g., a base spring engagement), and is also configured to provide a return force biasing the slider toward the base and away from an activation direction.

In Step 902, a base is formed having interlocking sliding features and an engagement surface. The interlocking sliding features of the base may be keyed with various cutout portions (e.g., alignment notches) allowing the base to interlock with the slider. In one or more embodiments, the base may be formed from a rigid material such as aluminum. The base may or may not be formed from the same material as the slider formed in Step 900. The base may be anodized such that the base is thermally conductive but not electrically conductive. In one or more embodiments, one or more base protrusions are also formed as part of the base. The base protrusions may be orthogonal to an engagement surface of the base. In one or more embodiments, one or more base cutouts may be formed as part of the base. Forming the base may also include forming one or more mounting features.

In Step 904, a shape memory alloy is disposed between the engagement surface of the slider and the engagement surface of the base, as discussed above in the description of FIGS. 3-8.6. The shape memory alloy may be, for example, formed as a wire shape or as a ribbon shape. In one or more embodiments, a tension is placed on distal ends of the shape memory alloy to keep the shape memory alloy in contact with the base.

In Step 906, at least two ohmic contacts are disposed through the base. In one or more embodiments, the ohmic contacts are disposed in cavities or holes in the base configured to house the ohmic contacts. The ohmic contacts may be affixed to the base such that the ohmic contacts are less likely to scratch the base, which may affect the electrical insulation of the base gained via the anodization performed in Step 902.

In Step 908, the shape memory alloy is secured to the ohmic contacts. In one or more embodiments, the shape memory alloy is secured to the ohmic contacts via a washer and screw. In other embodiments, the shape memory alloy is secured to the ohmic contacts via solder.

Turning to FIG. 9.2, FIG. 9.2 shows a method for manufacturing the base and slider component of the haptic actuator according to various embodiments of the present invention. Specifically, FIG. 9.2 shows a method for manufacturing the slider and portion components required in step 900 and 902 of FIG. 9.2.

Continuing with FIG. 9.2, in step 910 a single extrusion is formed for the slider component and base component. Said another way, in one or more embodiments, an identical starting form is created for the slider and base components. In one embodiment, a single sided computer numerical control (CNC) machine process may be used to form both the slider and base components. In one embodiment, the process is performed on material comprising aluminum (e.g., 6060 aluminum) or similar material which provides similar thermal process and may be anodized.

In Steps 912 and 914, the same starting component is processed differently to form the slider and base component respectively. Specifically, a single sided CNC process may be used to form the base and slider component.

In Steps 916 and 918, the surfaces of the slider and base component are at least partially anodized. The anodize process provides electrical isolation between the ohmic contacts, the shape memory alloy, the slider and base.

FIGS. 10.1-10.5 show an example of the method in FIG. 9.2, according to various embodiments. In one or more embodiments, a single extrusion, shown in FIG. 10.1, is formed from a raw material. As described above in Steps 912 and 914 of FIG. 9.2, the base and slider components may each be formed using on a single sided CNC process on a component such as that shown in FIG. 10.1 (e.g., the single extrusion shown in FIG. 10.1) to form the base (shown in FIG. 10.2) and slider (shown in FIG. 10.3). Specifically, portions of base of FIG. 10.2 and slider of FIG. 10.3 have been removed from a single extrusion such as that shown in FIG. 10.1 to form the features of the base and slider, respectively, according to steps 912 and 914 of FIG. 9.2. As described above in Steps 916 and 918 of FIG. 9.2, the surfaces of the base and slider components are thereafter anodized to obtain an anodized base as shown in FIG. 10.4 and an anodized slider as shown in FIG. 10.5.

Figure 11:
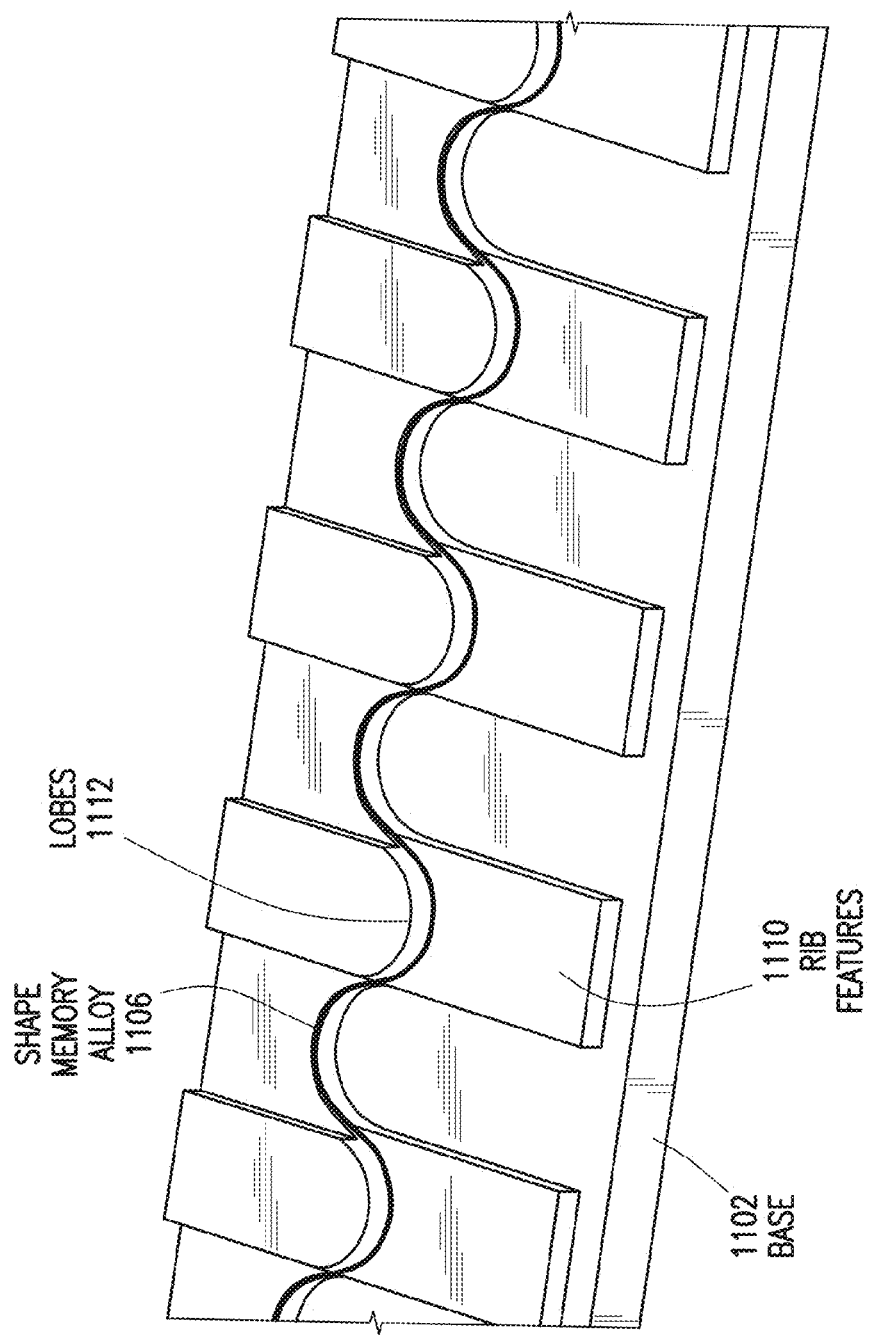
FIG. 11 shows a partial perspective view of a portion of a haptic actuator in accordance with one or more embodiments of the invention.

FIG. 11 shows a partial perspective view of a portion of a haptic actuator according to one or more embodiments. Specifically, embodiments such as that shown in FIG. 11 include a base component (1102), a shape memory alloy (1106), rib features (1110) and lobes (1112). In one or more embodiments, the rib features (1110) are formed as part of the machining of the base component (1102) (e.g., as part of the process described above in Step 912 of FIG. 9.2). In one or more embodiments, the rib features (1110) are configured to nest with complimentary features on the slider portion (see, e.g., the description of FIG. 12, below) and to capture the shape memory alloy (1106) between the base component (1102) and the slider component (not shown). In various embodiments, the rib features (1110) are configured to prevent the shape memory alloy (1106) from moving up or down on the lobes (1112) by capturing the wire between the rib features of the base component (1102) and the slider component.

Turning to FIGS. 12.1 and 12.2, FIGS. 12.1 and 12.2 each show a different partial perspective view of an assembled haptic actuator according to one or more embodiments. In embodiments such as that shown in FIG. 12.1, the assembled haptic actuator includes a base component (1202) and slider component (1203). Both the base and slider may include rib features (1210) (as previously shown in FIG. 11) to facilitate interlocking between the base component (1202) and slider component (1203). In various embodiments, the shape memory alloy (1206) is restricted from translating away from the lobes (e.g., lobes (1212) in FIG. 12.2) during actuation of the slider (1203) relative to the base component (1202).

Turning to FIG. 12.2, a perspective view of the base component (1202) and slider component (1203) (shown semi-transparent for ease of viewing) are assembled to form the assembled haptic actuator. As shown, the shape memory alloy (1206) is secured against the lobes (1212) between the base component (1202) and slider component (1203).

Turning to FIG. 12.3, a top view of an assembled haptic actuation mechanism (1200) according to embodiments of the present invention. FIG. 12.3 shows a base (1202), a slider (1203), a spring element (1280) applying a biasing force in a direction (e.g., biasing force direction (1240)) opposite direction of movement of the slider relative to the base (e.g., activation direction (1204)). Movement of the slider (1203) occurs in response to a current applied to the shape memory alloy (1206) through ohmic contacts (1236). In one embodiment, the current is applied through the solder lug (1232) (as also shown in FIG. 8.2), and the ohmic contacts are coupled to a processing system (not shown). In one or more embodiments, in response to current applied to the shape memory alloy (1206), the shape memory alloy increases in temperature, and therefore contracts, exerting a force on the lobes (1212) of the base and slider, resulting in motion of the slider relative to the base in the activation direction (1204). In one or more embodiments, spring element (1280) provides a biasing force (1240) having a pre-load force sufficiently high to secure the assembled haptic actuator when not activated and sufficiently low to allow motion of the slider mechanism (1203) relative to the base component (1202) in the activation direction (1204) in response to current applied to the shape memory alloy (1206). In one embodiment, the pre-load force is in the range of 20-50 grams.

In various embodiments, the base (1202) is physically coupled to an input device or a housing of an electronic system (e.g., 202 or 201 of FIG. 2). The coupling may be performed by securing the base (1202) via the mounting features (1210 and 1212) using, for example, screws, rivets, heat staking, etc. In response to motion of the slider mechanism (1203), the input device may translate in order to produce a haptic effect to a user interacting with the input device (e.g., the input surface (203) of an input device (e.g., input device 200 of FIG. 2). Specifically, the input device (e.g., input device 200 of FIG. 2) is configured to determine force applied to the input surface (e.g., using force sensors of the input device) and in response to a sufficient magnitude of force applied actuate the haptic actuator to provide feedback to the user applying the force.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A haptic actuator comprising:
   a slider having a first plurality of interlocking sliding features and a substantially planar first engagement surface;
   a base having a second plurality of interlocking sliding features and a substantially planar second engagement surface, the second plurality of interlocking sliding features configured to engage with the first plurality of interlocking sliding features;
   a shape memory alloy disposed between the first engagement surface and the second engagement surface; and
   a pair of ohmic contacts in direct contact with the shape memory alloy,
   wherein the shape memory alloy contracts and causes displacement, in a plane parallel to the substantially planar first and second engagement surfaces, of the slider relative to the base from a first position to a second position in response to a current applied to the shape memory alloy through the pair of ohmic contacts.

2. The haptic actuator of claim 1, wherein the first engagement surface includes a first plurality of protrusions that extends away from the slider in a direction that is orthogonal to a plane of a surface of the slider facing the base.

3. The haptic actuator of claim 2, wherein the second engagement surface includes a second plurality of protrusions that extends away from the base in a direction that is orthogonal to a plane of a surface of the base facing the slider.

4. The haptic actuator of claim 1, further comprising a spring element, wherein the spring element is disposed in a slot formed in the slider, wherein the spring element engages with a portion of the base and is configured to provide a return force biasing the slider toward the first position.

5. The haptic actuator of claim 4, wherein the return force of the spring element is overcome by a force exerted by the shape memory alloy on the slider and the base when the current is applied to the shape memory alloy through the pair of ohmic contacts, which causes the displacement of the slider relative to the base from the first position to the second position.

6. The haptic actuator of claim 1, wherein the slider comprises a spring element, wherein the spring element engages with a portion of the base and is configured to provide a return force biasing the slider towards the first position.

7. The haptic actuator of claim 1, wherein the pair of ohmic contacts is disposed through the base.

8. The haptic actuator of claim 7, wherein the first plurality of interlocking slide features comprises a first plurality of alignment notches and the second plurality of interlocking features comprises a second plurality of alignment notches, wherein the first plurality of alignment notches are offset from the second plurality of alignment notches such that the first plurality of alignment notches and the second plurality of alignment notches allow the slider to interlock with the base.

9. The haptic actuator of claim 1, wherein each ohmic contact of the pair of ohmic contacts secures a distal end of the shape memory alloy to at least one of the base and the slider.

10. The haptic actuator of claim 1, wherein the pair of ohmic contacts form a portion of the base.

11. The haptic actuator of claim 1, wherein both the slider and the base both comprise a material that is not electrically conductive on the surface and is thermally conductive.

12. The haptic actuator of claim 1, further comprising a plurality of ribs formed on at least one of the slider and the base.

13. The haptic actuator of claim 12, wherein the plurality of ribs overlap a portion of at least one of the slider and the base disposed adjacent to the plurality of ribs.

14. The haptic actuator of claim 13, wherein the plurality of ribs restrict displacement of the shape memory alloy out of engagement with at least one of the first engagement surface and the second engagement surface.

15. A method of manufacturing a haptic actuator, the method comprising:
   providing a slider having a first plurality of interlocking sliding features and a substantially planar first engagement surface;
   providing a base having a second plurality of interlocking sliding features and a substantially planar second engagement surface, the second plurality of interlocking sliding features configured to engage with the first plurality of interlocking sliding features;
   disposing a shape memory alloy between the first engagement surface and the second engagement surface;
   disposing a pair of ohmic contacts; and
   securing the shape memory alloy to the pair of ohmic contacts,
   wherein the shape memory alloy contracts and causes displacement, in a plane parallel to the substantially planar first and second engagement surfaces, of the slider relative to the base from a first position to a second position in response to a current applied to the shape memory alloy through the pair of ohmic contacts.

16. The method of claim 15, wherein the slider comprises a first plurality of protrusions on the first engagement surface, wherein the first plurality of protrusions extend away from the slider in a direction that is orthogonal to a plane of a surface of the slider configured to face the base.

17. The method of claim 15, wherein the base comprises a second plurality of protrusions on the second engagement surface, wherein the second plurality of protrusions extend away from the base in a direction that is orthogonal to a plane of a surface of the base configured to face the slider.

18. The method of claim 15, further comprising a spring element configured to engage with a portion of the base and a portion of the slider and configured to provide a return force biasing the slider toward the first position.

19. A haptic actuator comprising:
   a slider having a first plurality of interlocking sliding features and a first engagement surface;
   a base having a second plurality of interlocking sliding features and a second engagement surface, the second plurality of interlocking sliding features configured to engage with the first plurality of interlocking sliding features, wherein the first plurality of interlocking sliding features extends toward the second engagement surface and the second plurality of interlocking sliding features extends toward the first engagement surface;
   a shape memory alloy located between the first engagement surface and the second engagement surface;
   a pair of ohmic contacts in direct contact with the shape memory alloy and configured to apply a current to the shape memory alloy and cause displacement of the slider relative to the base from a first position to a second position;
   at least one side tab spanning a region between the first engagement surface and the second engagement surface and configured to restrict displacement of the shape memory alloy in a direction perpendicular to the displacement of the slider; and a spring element configured to engage with the base and the slider and provide a return force biasing the slider relative to the base toward the first position.

20. The haptic actuator of claim 19, wherein the at least one side tab is disposed on at least one peak of at least one selected from a group consisting of the first and the second plurality of interlocking features.

* * * * *